US011024303B1

(12) United States Patent
Devaraj et al.

(10) Patent No.: US 11,024,303 B1
(45) Date of Patent: Jun. 1, 2021

(54) COMMUNICATING ANNOUNCEMENTS

(71) Applicant: Amazon Technologies, Inc., Seattle, WA (US)

(72) Inventors: Christo Frank Devaraj, Seattle, WA (US); Farookh Mohammed, Woodinville, WA (US); James Alexander Stanton, Seattle, WA (US); Brandon Taylor, Seattle, WA (US); Peter Chin, Bellevue, WA (US); Mahesh Rajagopalan, Irving, TX (US)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 15/708,874

(22) Filed: Sep. 19, 2017

(51) Int. Cl.
*G10L 15/22* (2006.01)
*G10L 15/30* (2013.01)
*G10L 17/22* (2013.01)
*G06F 3/16* (2006.01)
*H04R 3/12* (2006.01)
*G10L 15/18* (2013.01)
*G06F 40/169* (2020.01)
*G06F 40/205* (2020.01)

(52) U.S. Cl.
CPC .............. *G10L 15/22* (2013.01); *G06F 3/167* (2013.01); *G10L 15/1815* (2013.01); *G10L 15/30* (2013.01); *G10L 17/22* (2013.01); *H04R 3/12* (2013.01); *G06F 40/169* (2020.01); *G06F 40/205* (2020.01); *G10L 2015/223* (2013.01)

(58) Field of Classification Search
CPC ....... G10L 15/22; G10L 15/26; G10L 15/222; G10L 2015/221; G10L 2015/223; G10L 15/30; H04W 4/06

USPC ............... 704/231, 235, 270, 270.1, 275
See application file for complete search history.

(56) References Cited

U.S. PATENT DOCUMENTS

| 4,769,837 | A | 9/1988 | McCormick et al. |
|---|---|---|---|
| 9,571,302 | B2 * | 2/2017 | Scannell ............... H04W 68/00 |
| 9,807,499 | B2 * | 10/2017 | Stewart .................. H04R 3/005 |
| 10,083,006 | B1 * | 9/2018 | Feuz ....................... G10L 15/22 |
| 10,200,333 | B1 * | 2/2019 | Lei ......................... G06F 16/955 |
| 10,217,461 | B1 * | 2/2019 | Carlson ............... G10L 21/0208 |
| 10,425,780 | B1 * | 9/2019 | Devaraj .................. G10L 15/22 |
| 10,425,781 | B1 * | 9/2019 | Devaraj .................. H04W 4/08 |
| 10,431,188 | B1 * | 10/2019 | Nelson ............... G06Q 10/0833 |
| 10,616,726 | B1 * | 4/2020 | Freeman, II ............ G10L 15/08 |
| 10,706,845 | B1 * | 7/2020 | Devaraj .................. G10L 15/30 |

(Continued)

OTHER PUBLICATIONS

The Examiner's attention is hereby drawn to the specification and file history of U.S. Appl. No. 15/709,037, titled "Communicating Announcements", filed Sep. 19, 2017, which may contain information relevant to the present application.

*Primary Examiner* — Martin Lerner
(74) *Attorney, Agent, or Firm* — Pierce Atwood LLP

(57) ABSTRACT

Techniques for communicating announcements across devices are described. A system performs speech processing on input audio data to determine a command to output an announcement. The system determines devices outputting indicators representing users are proximate thereto. The system generates output audio data corresponding to at least a portion of the input audio data corresponding to announcement content. The system sends the output audio data to the devices along with instructions to output audio corresponding to the output audio data.

21 Claims, 32 Drawing Sheets

(56) References Cited

U.S. PATENT DOCUMENTS

| | | | |
|---|---|---|---|
| 2002/0050927 A1* | 5/2002 | De Moerloose | H04L 67/04 |
| | | | 340/539.1 |
| 2004/0250285 A1 | 12/2004 | Murphy et al. | |
| 2007/0116197 A1 | 5/2007 | O'Neill | |
| 2011/0029315 A1 | 2/2011 | Nichols et al. | |
| 2014/0172557 A1 | 6/2014 | Eden et al. | |
| 2014/0232328 A1 | 8/2014 | Pegg | |
| 2014/0315511 A1* | 10/2014 | Cha | H04W 4/06 |
| | | | 455/404.1 |
| 2014/0370879 A1* | 12/2014 | Redding | H04W 4/06 |
| | | | 455/419 |
| 2016/0128104 A1* | 5/2016 | Logue | H04W 4/06 |
| | | | 370/329 |
| 2016/0195856 A1 | 7/2016 | Spero | |
| 2016/0307413 A1* | 10/2016 | Rafii | G10L 15/26 |
| 2017/0070847 A1* | 3/2017 | Altman | H04W 4/06 |
| 2017/0245125 A1* | 8/2017 | Child | H04W 4/16 |
| 2017/0330585 A1* | 11/2017 | Bostick | G10L 15/26 |
| 2017/0332035 A1 | 11/2017 | Shah et al. | |
| 2017/0349184 A1* | 12/2017 | Tzirkel-Hancock | G06F 3/167 |
| 2018/0061404 A1* | 3/2018 | Devaraj | G10L 15/22 |
| 2018/0063859 A1* | 3/2018 | Anantharaman | H04L 67/12 |
| 2018/0205812 A1* | 7/2018 | Peterson | H04M 1/6058 |
| 2018/0288104 A1* | 10/2018 | Padilla | G10L 15/22 |
| 2018/0350363 A1* | 12/2018 | Cook | G10L 15/22 |
| 2019/0037642 A1* | 1/2019 | Price | H04L 51/14 |
| 2020/0092687 A1* | 3/2020 | Devaraj | G10L 15/22 |
| 2020/0357399 A1* | 11/2020 | Devaraj | G10L 15/1815 |

* cited by examiner

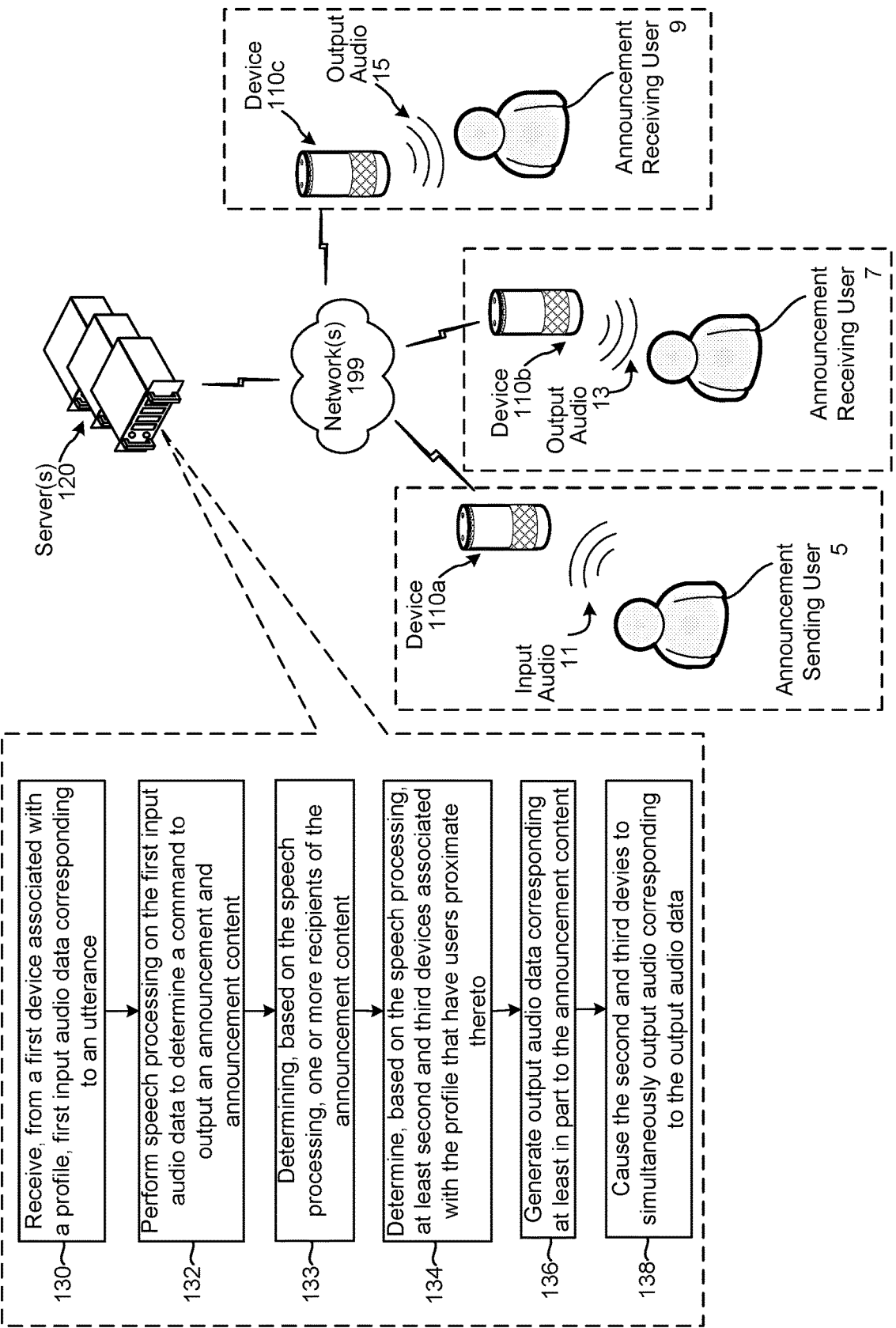

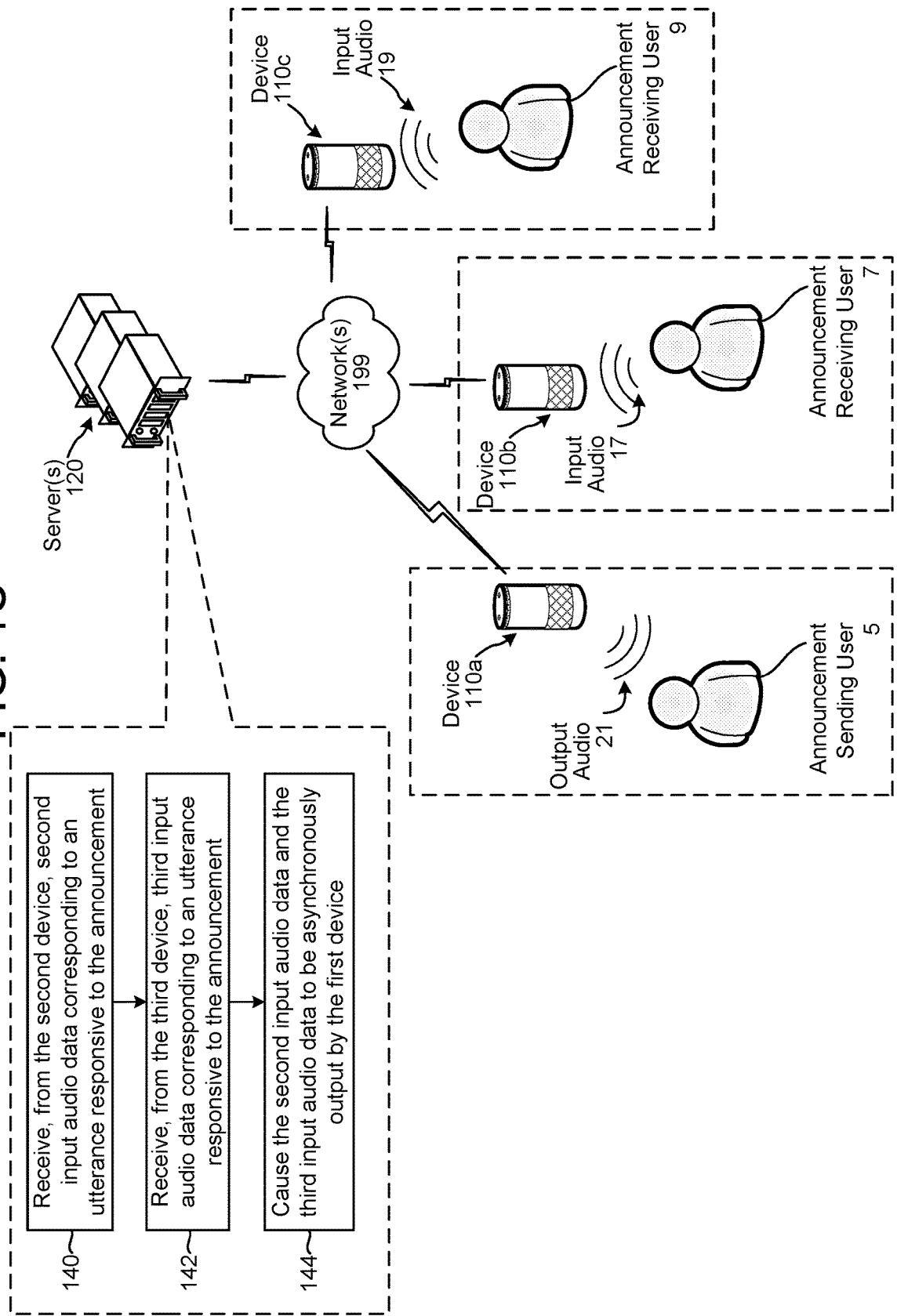

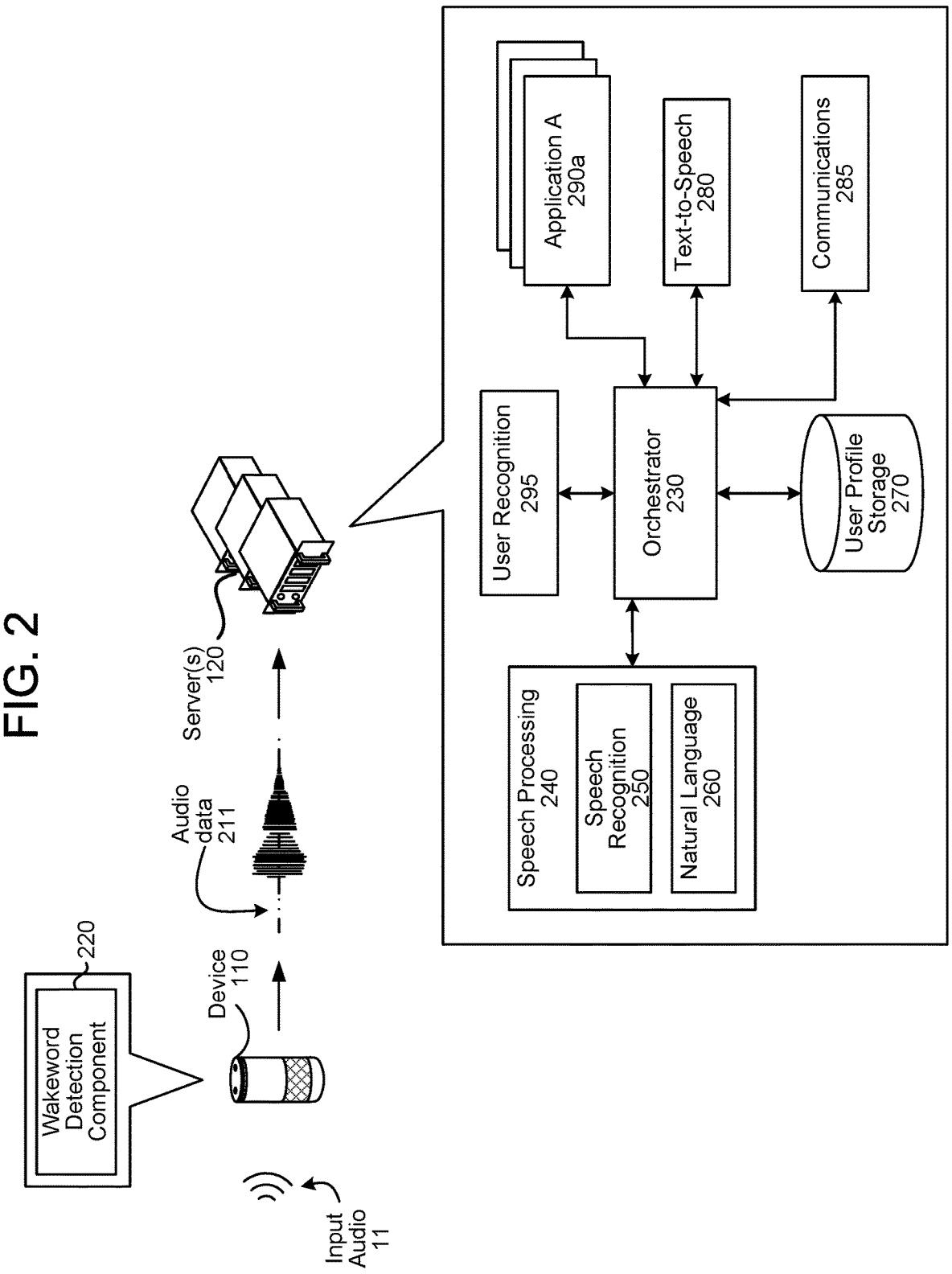

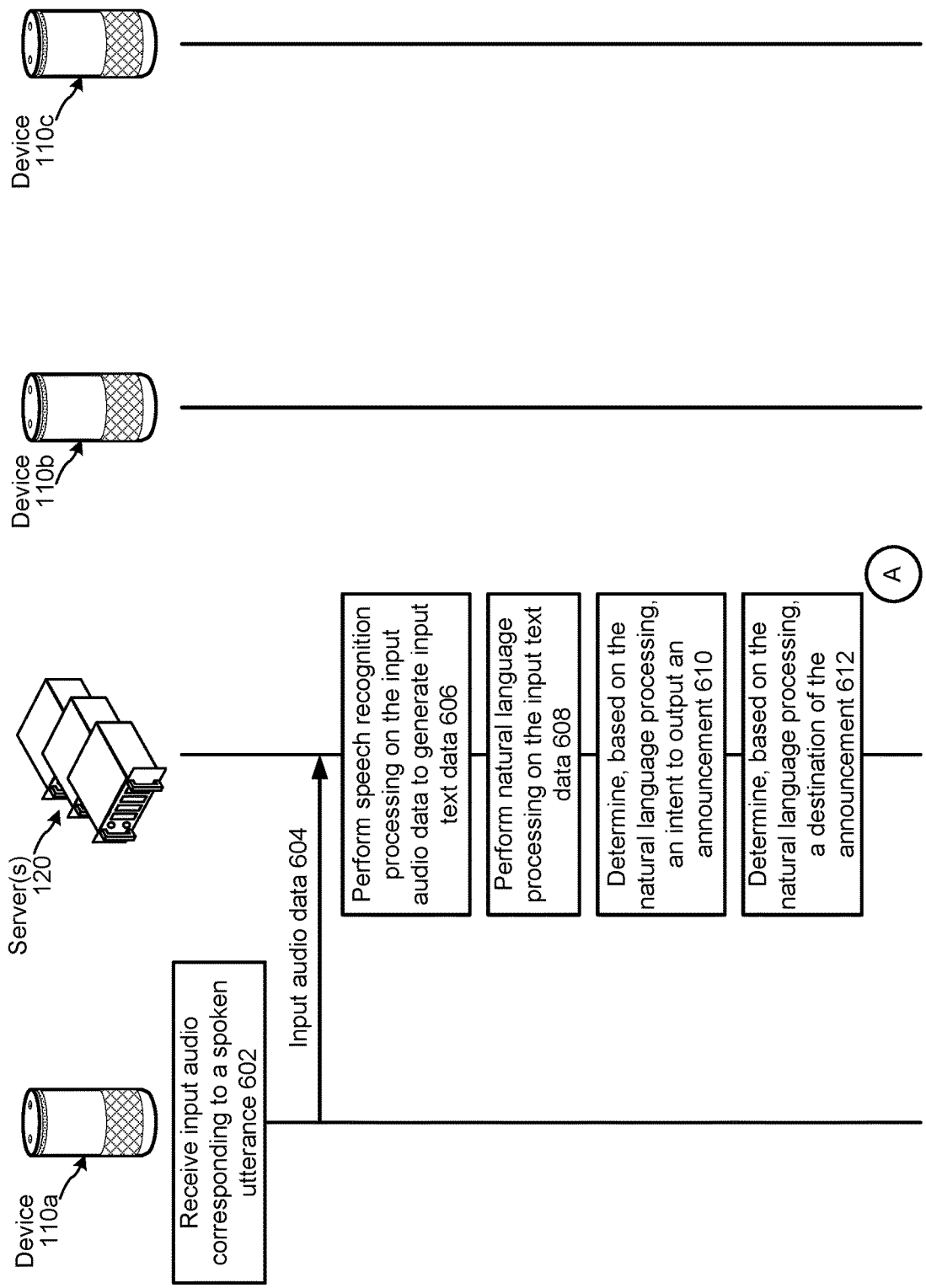

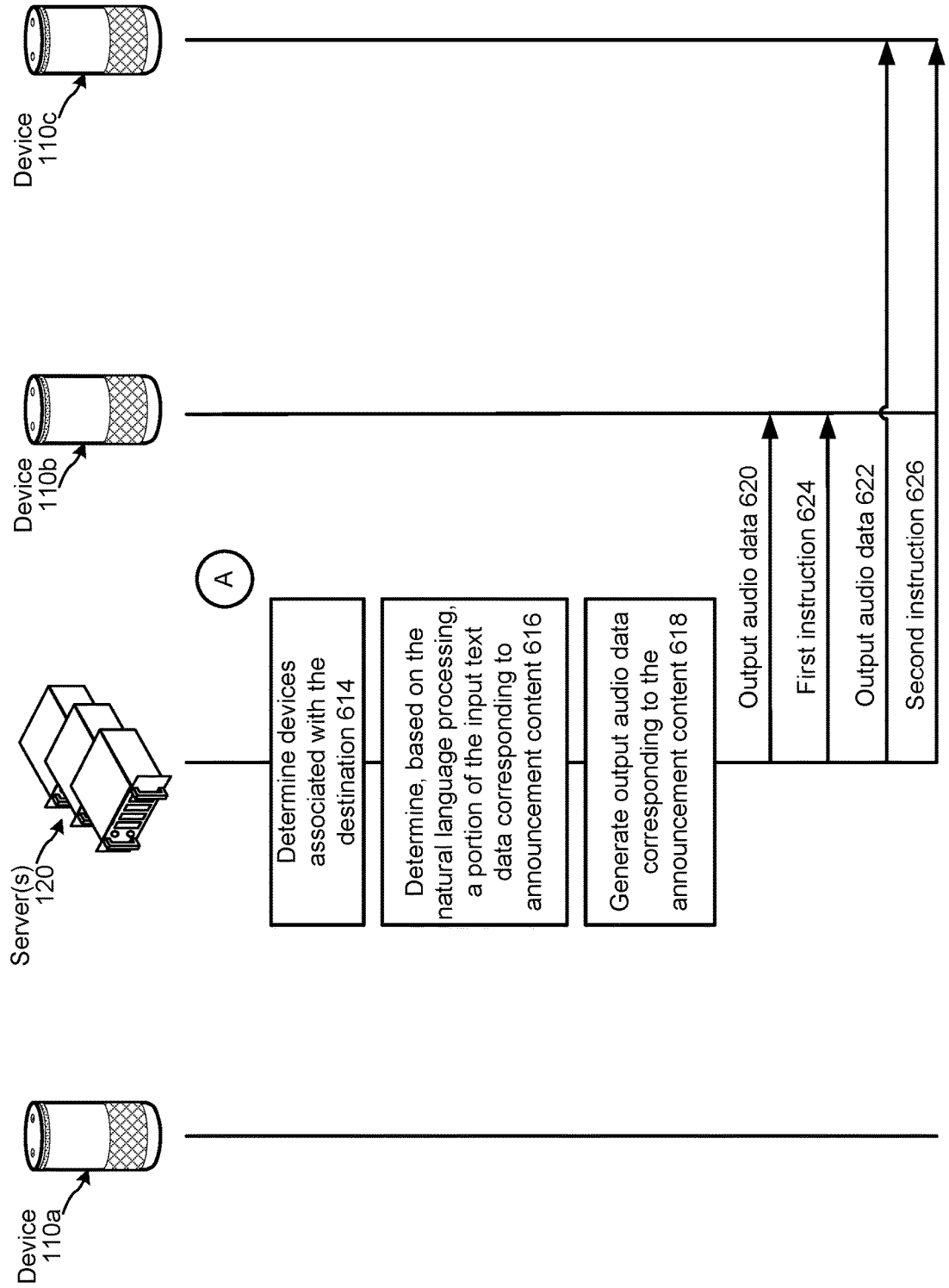

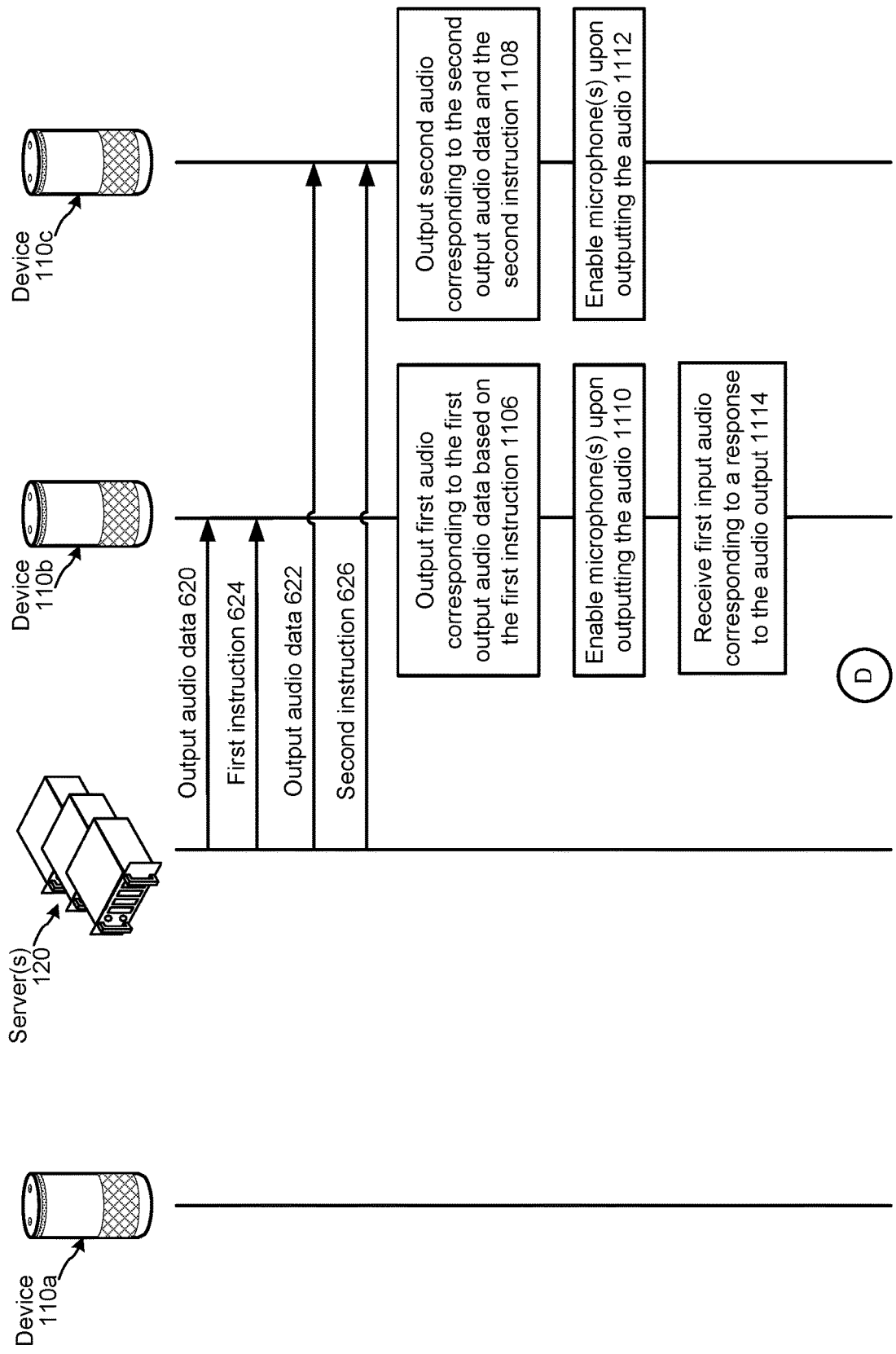

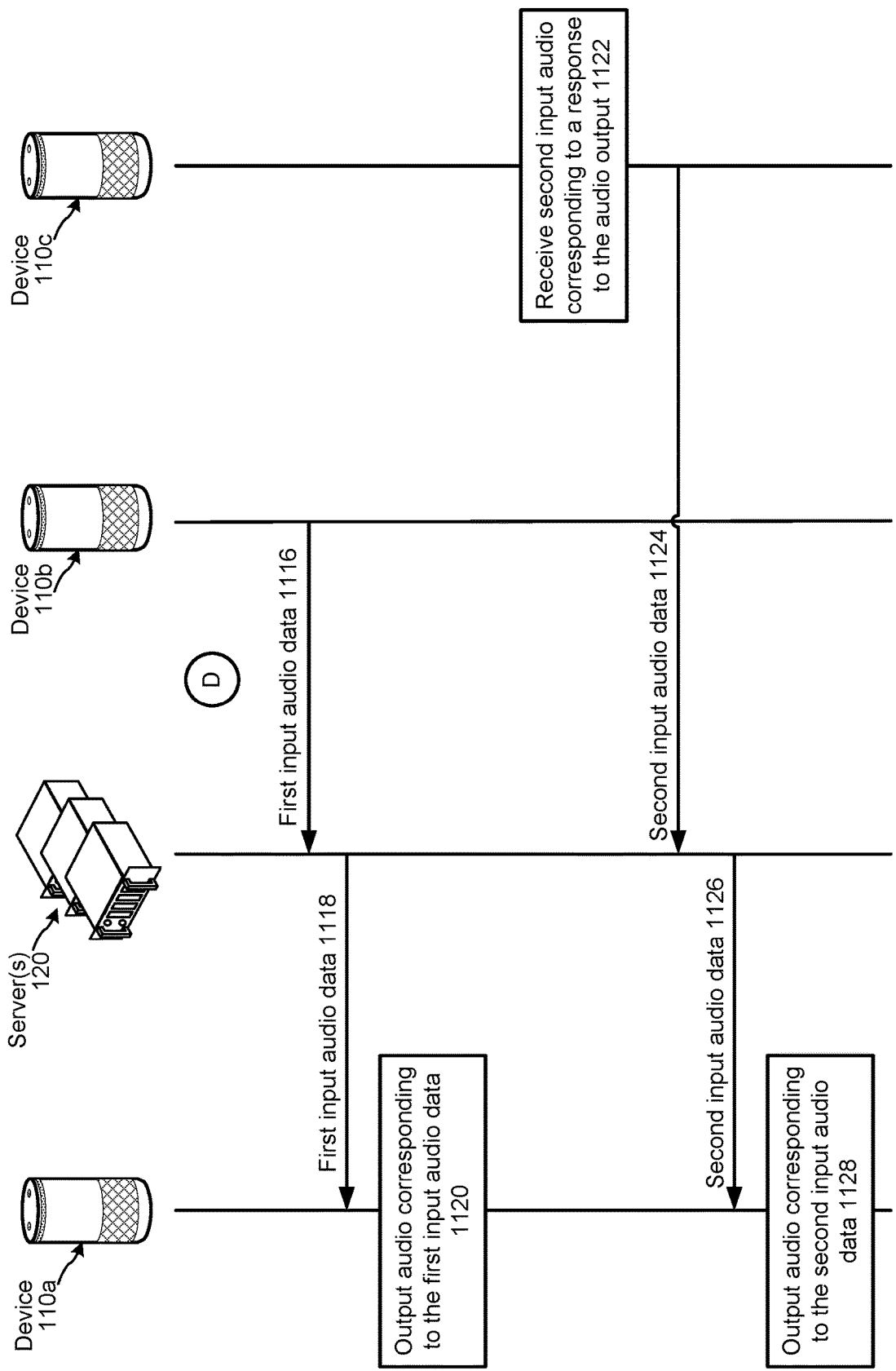

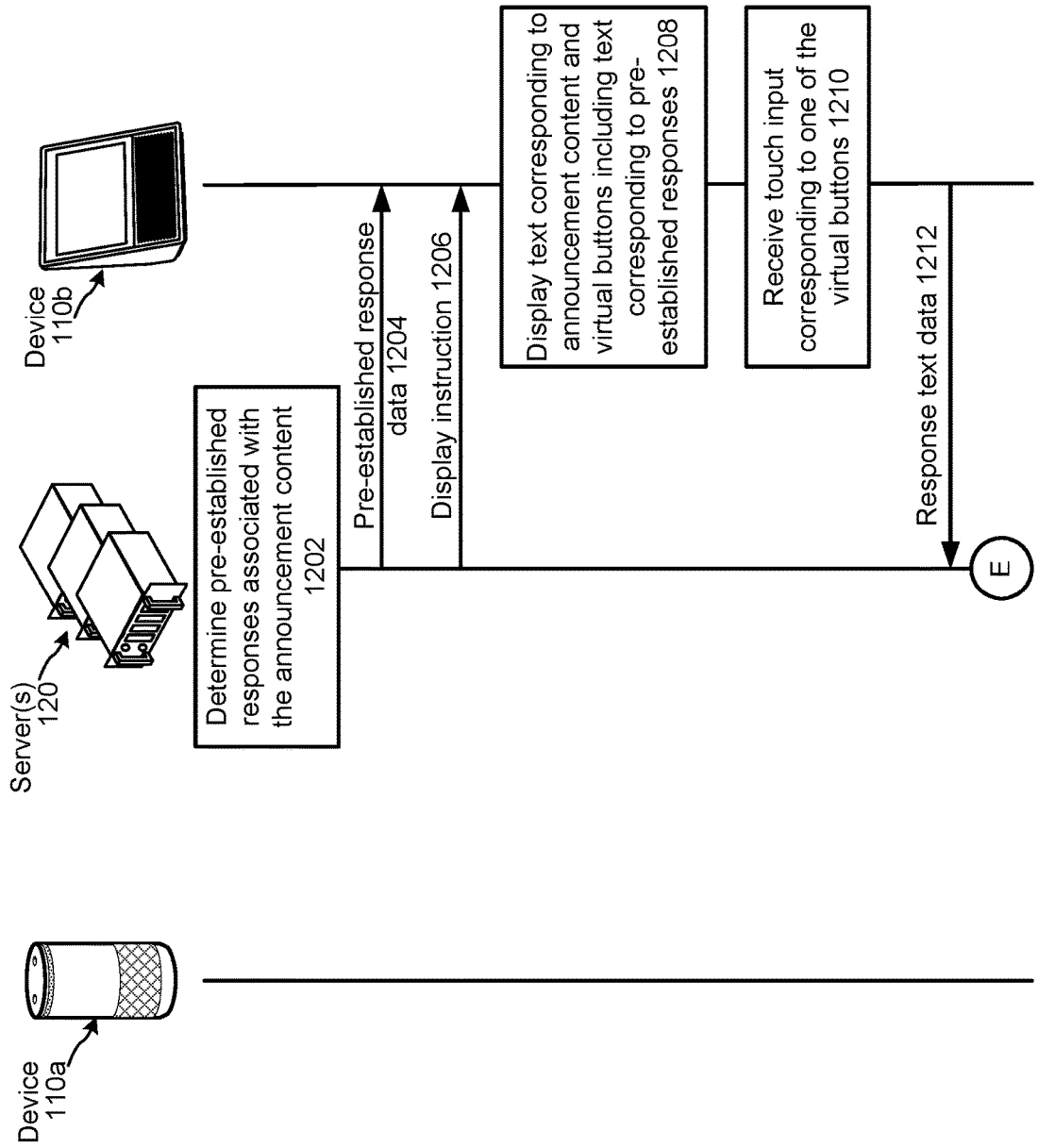

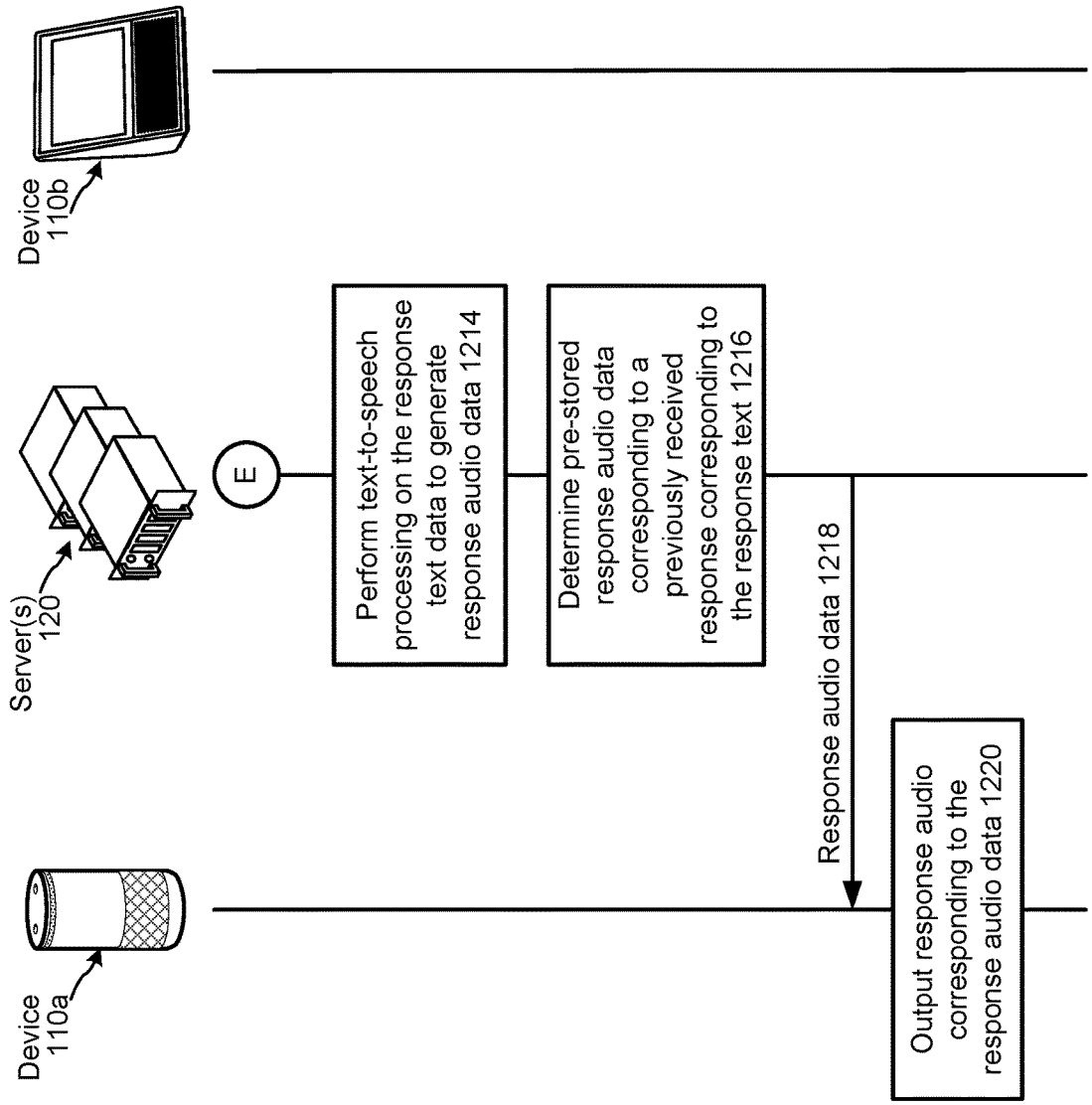

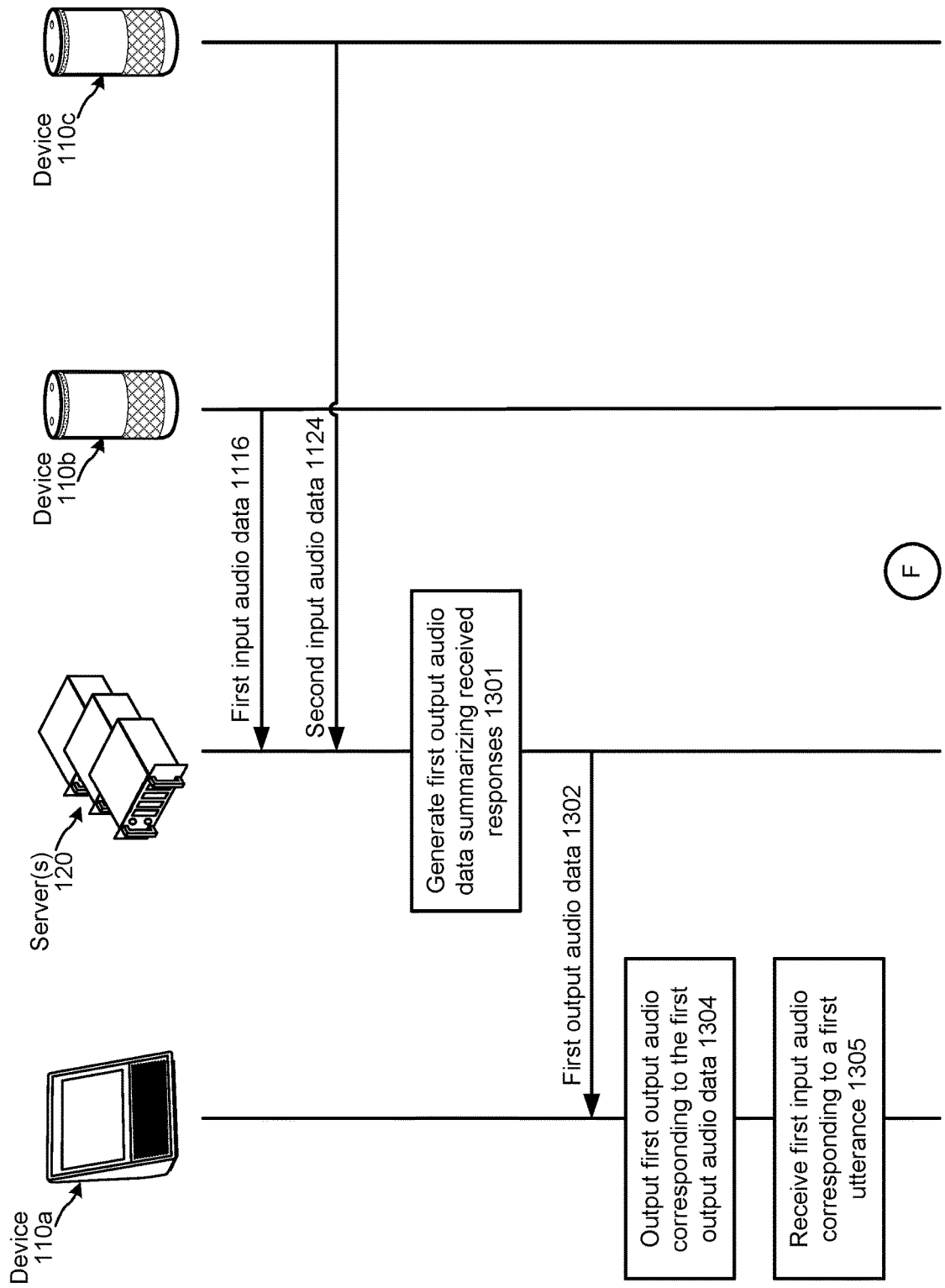

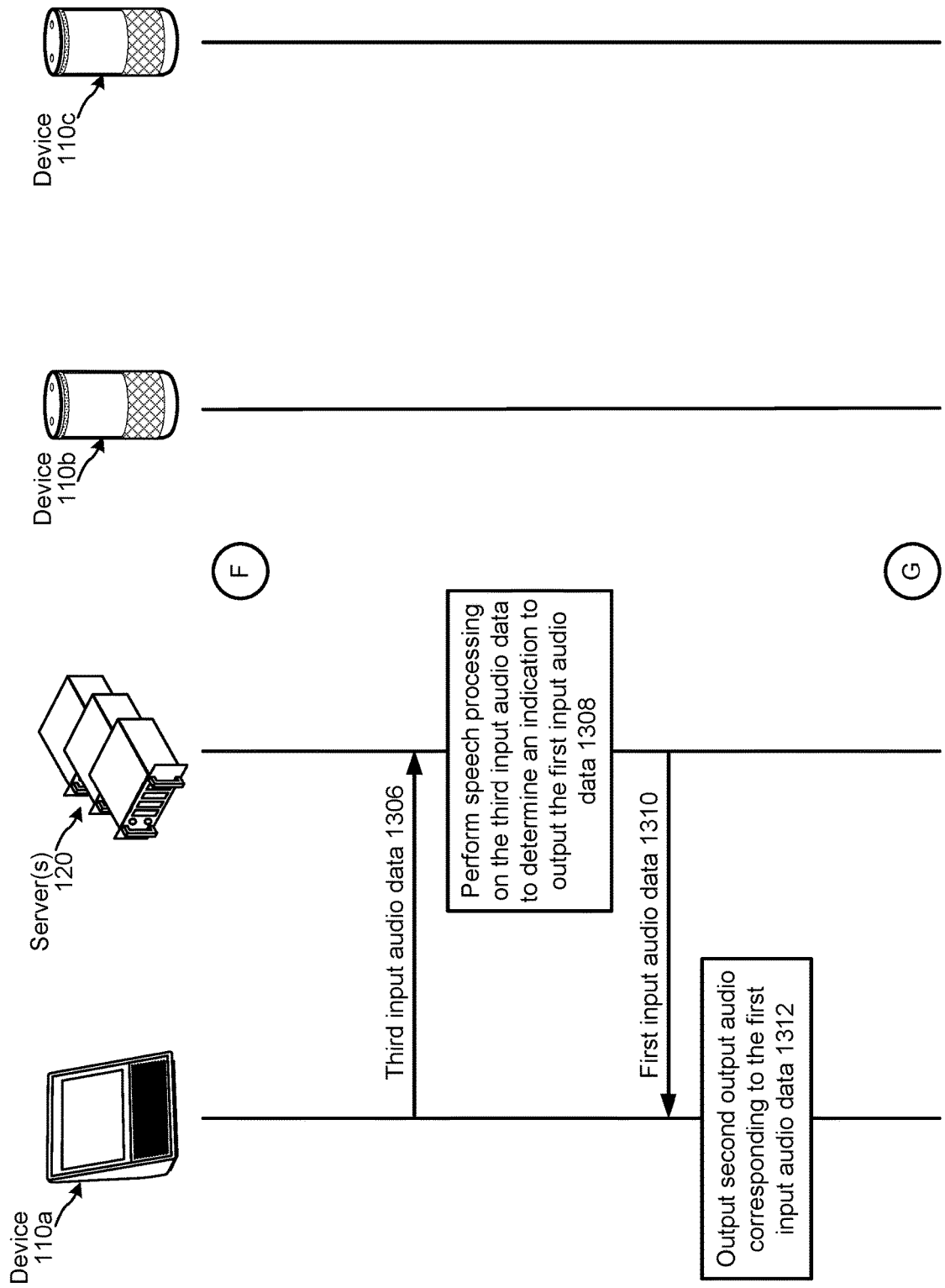

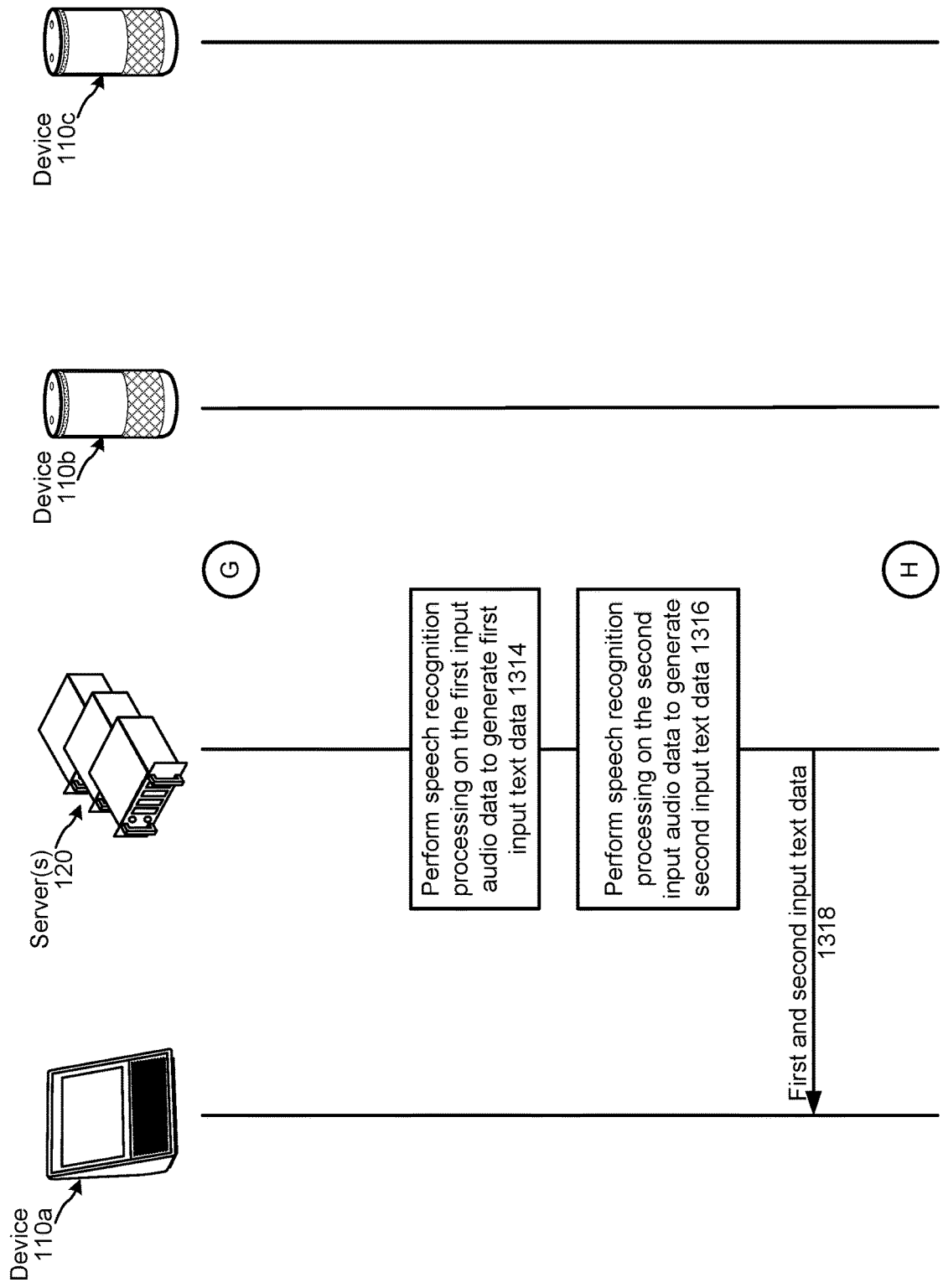

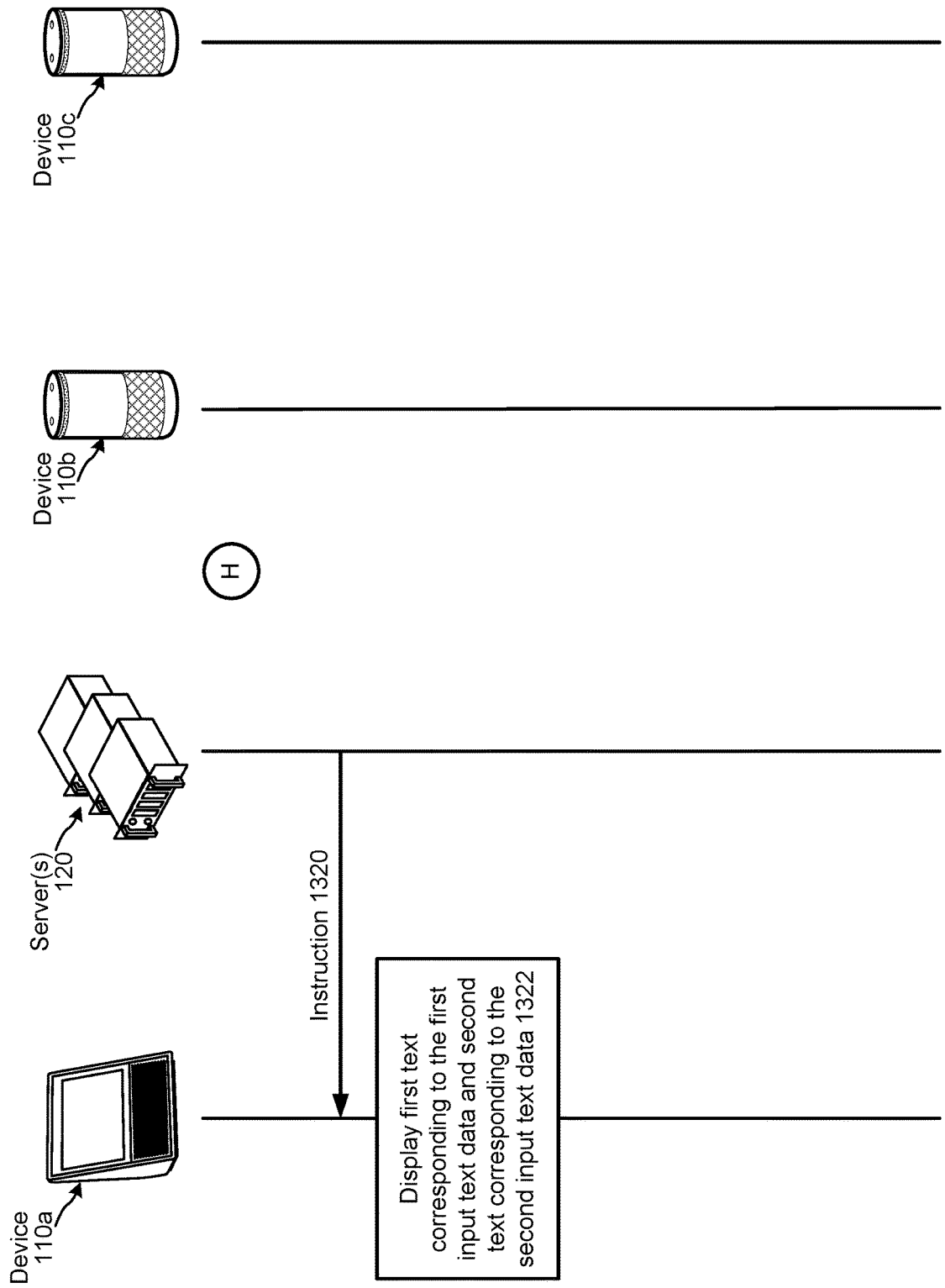

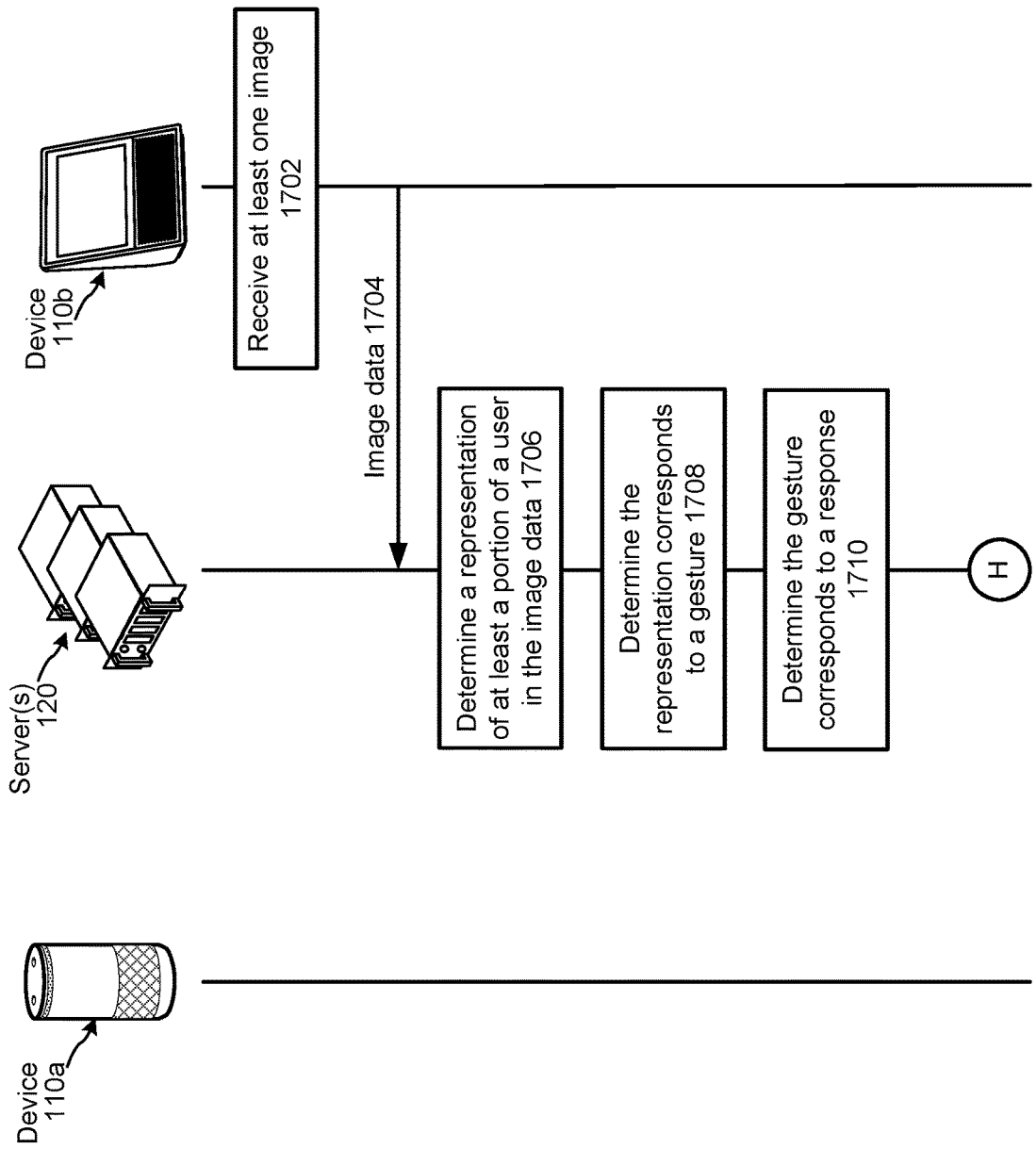

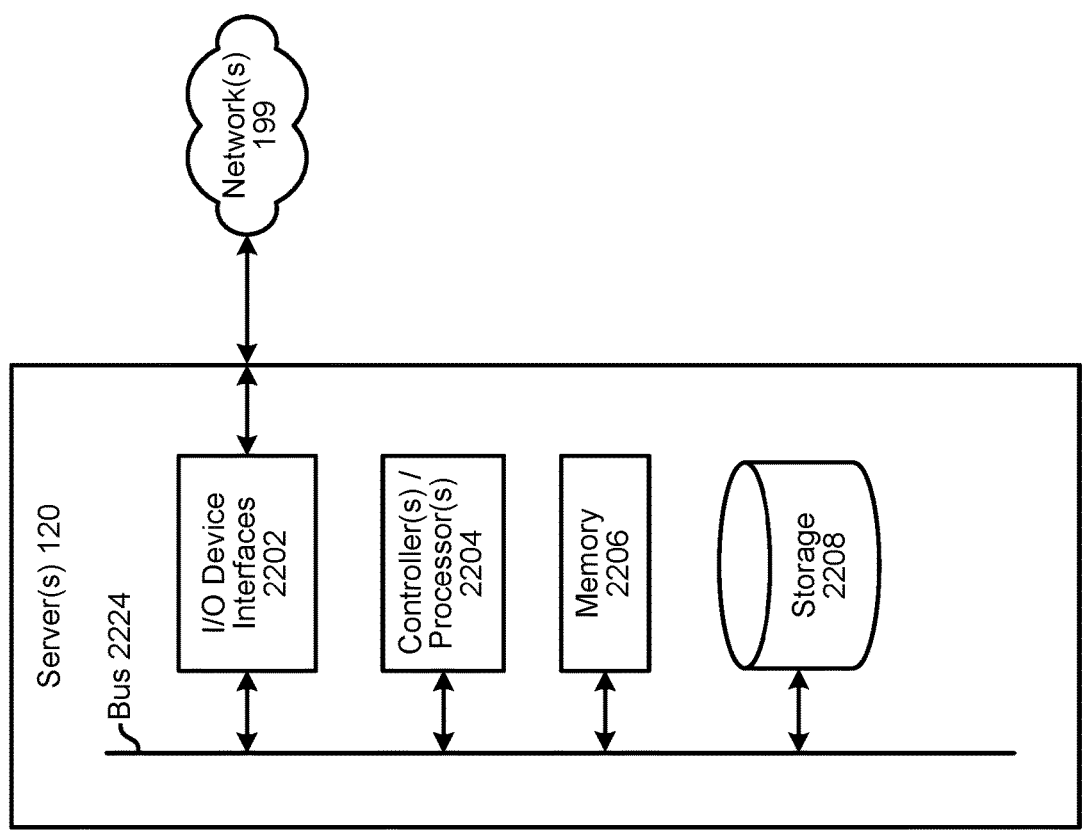

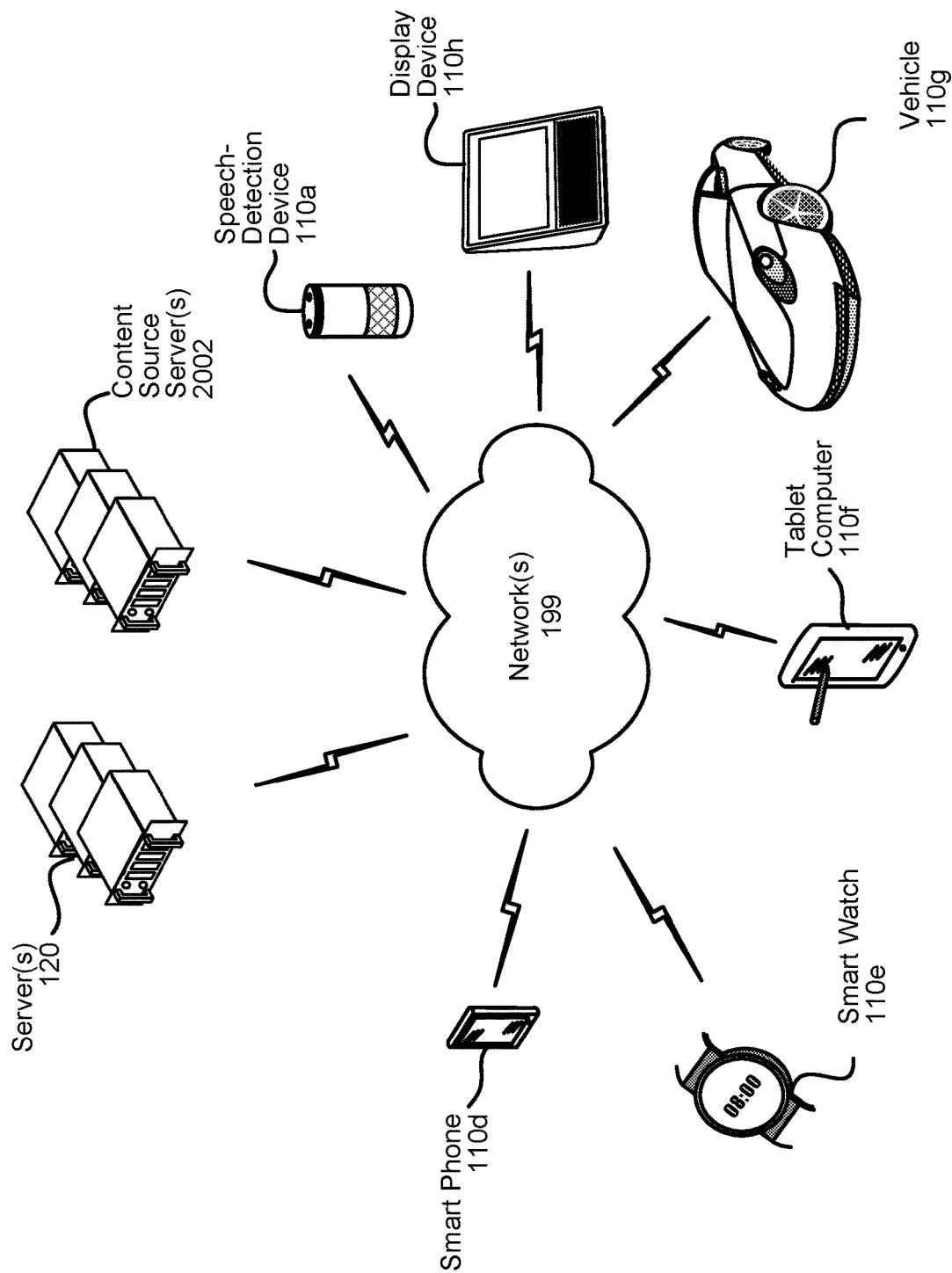

COMMUNICATING ANNOUNCEMENTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B illustrates a system configured to output announcement data by more than one device according to embodiments of the present disclosure.

FIG. 1C illustrates a system configured to output announcement response data by a device that originated the announcement according to embodiments of the present disclosure.

FIG. 2 is a conceptual diagram of components of a system according to embodiments of the present disclosure.

FIGS. 6A and 6B are a signal flow diagram illustrating the output of an announcement by multiple devices according to embodiments of the present disclosure.

FIGS. 11A and 11B are a signal flow diagram illustrating the capture and output of responses to an announcement according to embodiments of the present disclosure.

FIGS. 12A and 12B are a signal flow diagram illustrating the output of announcement content and capture of responses to the announcement content via a display of a device according to embodiments of the present disclosure.

FIGS. 13A through 13D are a signal flow diagram illustrating the output of responses to announcement content according to embodiments of the present disclosure.

FIGS. 17A and 17B are a signal flow diagram illustrating a gesture based response to an announcement according to embodiments of the present disclosure.

FIG. 22 is a block diagram conceptually illustrating example components of a server according to embodiments of the present disclosure.

FIG. 23 illustrates an example of a computer network for use with the speech processing system.

DETAILED DESCRIPTION

Figure 1A:
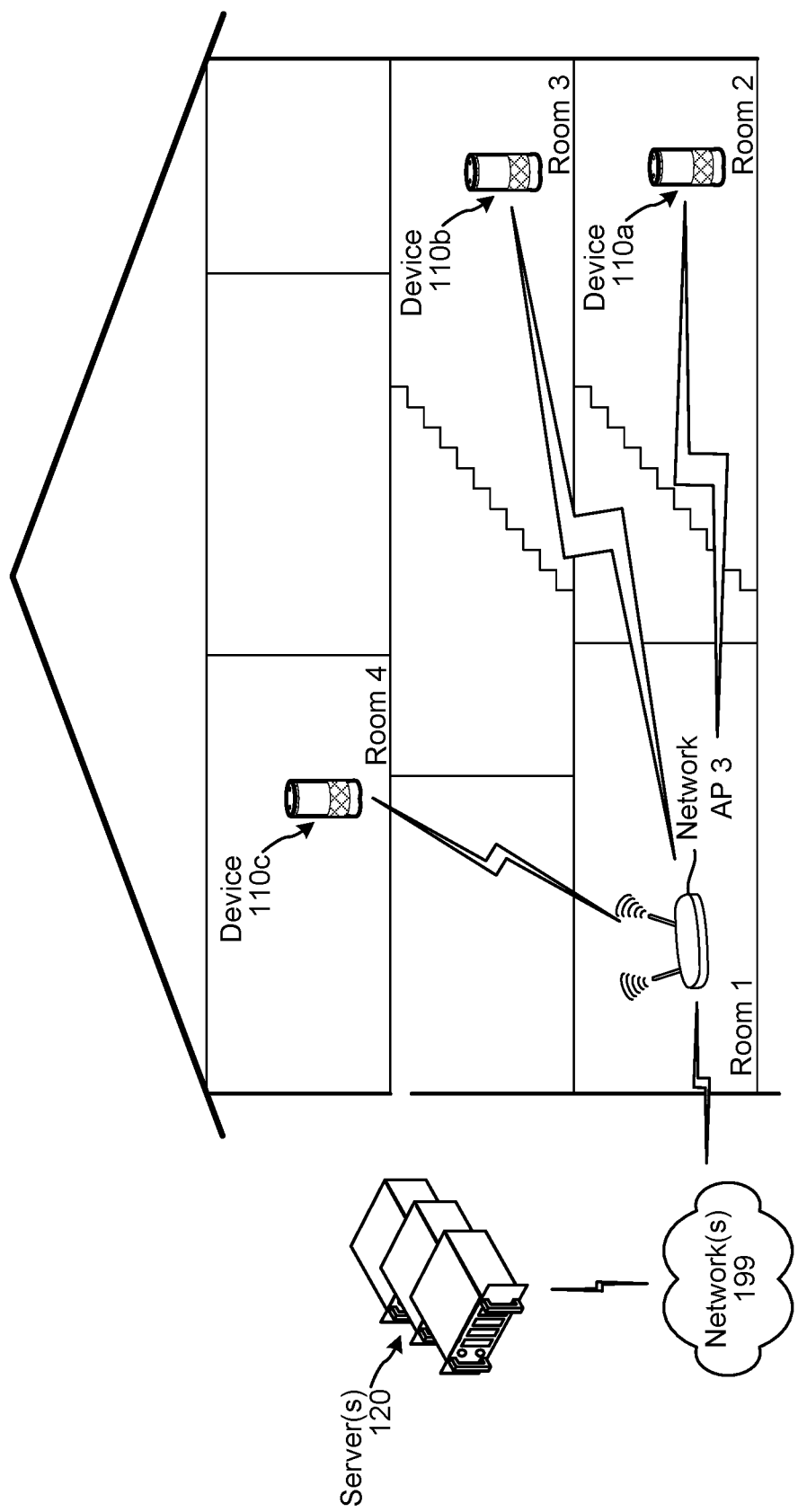
FIG. 1A illustrates a system for executing communications relating to announcements according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may be configured to answer user commands requesting the output of content. Such a system may additionally be configured to enable a user of one device to communicate to a user of another device. For example, a user may say "Alexa, tell John, I bought us tickets to tonight's game." The system may cause the utterance—captured by a first device—to be output by a second device to a second user. Moreover, a user may say "Alexa, call John." The system may open a real-time communication channel between a device that captured the utterance and a device associated with a user named John.

The present disclosure improves speech controlled computing systems by enabling a system to capture an utterance by a first device and cause multiple other devices (which may be proximate to multiple other users) to output the utterance. For example, a first user may speak an announcement to a first device in a household, such as "Alexa, tell everyone dinner's ready." The system may perform some analysis of the utterance to determine that the utterance is calling for an announcement to a group of other users. The system may determine other devices in the household with users proximate thereto, and may cause those devices to output the announcement. The system may also interrupt devices that the announcement is being sent to, thus causing recipient devices that are currently outputting some other content (like music) to cease output of the content in order for the announcement to be output. Thus, the system can take an announcement by someone, figure out who the announcement is supposed to go to, and send it to the recipients' devices. The system may further determine that a receiving user is unavailable and may cause a device proximate the receiving user to indicate the announcement has been stored for output when convenient for the receiving user.

The present disclosure also enables a system to output generated responses to an announcement. Thus when recipient devices announce "dinner's ready," multiple receiving users may simultaneously (or in some overlapping manner) respond to their respective devices with different responses, such as "coming," "be there shortly," and the like. The system may indicate to the original sender how many recipients responded as well as the identity of the users that responded. The system may then allow the original sending user to determine whose response it wants to hear. The system may also present verbally spoken responses on a display of a device.

FIG. 1A illustrates a system for executing communications relating to announcements. Although the figures and discussion illustrate certain operational steps of the system in a particular order, the steps described may be performed in a different order (as well as certain steps removed or added) without departing from the intent of the disclosure. As illustrated in FIG. 1A, devices (110a/110b/110c) may be located in different locations (e.g., different rooms of a house). The devices (110a/110b/110c) communicate with a network access point (e.g., wireless router) 3 to communicate with one or more servers 120 across one or more networks 199.

As illustrated in FIG. 1B, the server(s) 120 is configured to cause announcement data to be output by more than one device. A first device 110a captures input audio 11 corresponding to a spoken utterance of an announcement sending user 5. The first device 110a generates input audio data corresponding to the input audio 11 and sends the input audio data to the server(s) 120.

The server(s) 120 receives (130) the input audio data from the first device 110a. The first device 110a may be associated with a profile stored by the server(s) 120. The server(s) 120 performs (132) speech processing (e.g., speech recognition processing and natural language processing) on the input audio data to determine a command to output an announcement as well as content of the announcement. For example, for an utterance of "Alexa, tell everyone that dinner's ready," a wakeword portion may correspond to "Alexa," the command portion may correspond to "tell everyone that," and the content portion may correspond to "dinner's ready."

The server(s) 120 determines (133), based on the speech processing (e.g., based on natural language processing), one or more recipients of the announcement content. The one or more recipients can correspond to one or more devices (e.g., hallway device, living device), etc. The one or more recipients may also or alternatively correspond to one or more users of the system (e.g., John, Joe, etc.).

The server(s) 120 also determines (134), based on the speech processing, at least a second device 110b and a third device 110c, associated with the same profile as the first device 110a that originated the input audio data, which have users proximate thereto. If the server(s) 120 determines the speech processing indicates the identity (e.g., John, Joe, etc.) of one or more recipients, the server(s) 120 may determine a destination device associated with each recipient (e.g., may determine a device proximate to each recipient). The profile may include devices located in the same household. For example, various devices (which may include the second device 110b and the third device 110c) may detect a user using image data, audio data, or other input data. Such data may be passed to the server(s) 120 or other device(s) which may determine which individual users are proximate to what audio output device(s).

The system may determine a user is proximate to or near a device based on image data. A device 110 of the system may receive one or more images from one or more cameras. The device 110 may process image data corresponding to the image(s) to attempt to locate facial features of a user, or at least a user nearby, where those features may include at least the eyes of a user. In other instances, the device 110 may process the image data to locate an object that is shaped like a human head. Facial recognition or any other such algorithm may be used to attempt to determine the presence of a user head, or other portion or feature of a user, in the field of view of at least one camera. The camera(s) may capture ambient light. Alternatively, the camera(s) may utilize infrared imaging, heat signature detection, or some other approach. While it is described that the device 110 may process the image data to determine a user within a field of view of a camera(s) of the device 110, it should be appreciated that the device 110 may send the image data to the server(s) 120, and the server(s) 120 can process the image data to determine a representation of a user in the image data.

The system may also or alternatively determine a user is proximate to or near a device based on audio data. A device 110 may receive audio from one or more microphone(s). The device 110 may process audio data corresponding to the audio to attempt to determine user speech. The device 110 may implement one or more voice activity detection techniques. A user may be considered proximate to or near the device if user speech is present in the audio data. While it is described that the device 110 may process the audio data to determine the presence of user speech, it should be appreciated that the device 110 may send the audio data to the server(s) 120, and the server(s) 120 can process the audio data to determine the presence of user speech.

The server(s) 120 generates (136) output audio data corresponding at least in part to the determined content of the announcement. The server(s) 120 then causes (138) the second device 110b and the third device 110c to at least partially simultaneously output audio (13/15) corresponding to the output audio data to respective announcement receiving users (7/9). For example, the server(s) 120 may send separate instructions to second device 110b and the third device 110c at the same time, with the instructions indicating the output audio data should be output immediately. The server(s) 120 thus pushes audio data to one or more announcement receiving devices 110 and causes the one or more announcement receiving devices 110 to output content without announcement receiving users (7/9) requesting the content be output.

As illustrated in FIG. 1C, the server(s) 120 is configured to collect and send responses to the announcement to the original sending device. Thus, the server(s) 120 may be configured to cause announcement response data received from multiple devices to be output by the device that originated the announcement. For example, one announcement recipient user 7 may speak a responsive utterance (represented by input audio 17) while another announcement recipient user 9 may speak a different responsive utterance (represented by input audio 19). The second device 110b captures input audio 17 corresponding to the spoken utterance of the announcement recipient user 7, generates second input audio data corresponding to the input audio 17, and sends the second input audio data to the server(s) 120. Likewise, the third device 110c captures input audio 19 corresponding to the spoken utterance of the announcement recipient user 9, generates third input audio data corresponding to the input audio 19, and sends the third input audio data to the server(s) 120. The input audios 17 and 19 are responsive to the original announcement and may be spoken by the announcement recipient users 7 and 9 at or substantially at the same time, or at different times in response to the original announcement.

The server(s) 120 receives (140) the second input audio data from the second device 110b as well as receives (142) the third input audio data from the third device 110c. The server(s) 120 causes (144) the input audio data received from the second device 110b and the third device 110c to be output by the first device 110a as output audio 21. For example, the server(s) 120 may synthesize output audio data corresponding to "you received responses from John and Joe, would you like to hear them." The announcement sending user 5 may then indicate they want to hear the responses, in which case the server(s) 120 may cause the responses of the announcement recipient users 7 and 9 to be output to the announcement sending user 5 sequentially. The announcement sending user 5 may alternatively indicate they want to hear the response of a particularly announcement recipient user, in which case the server(s) 120 may cause the response of that announcement recipient user be output to the announcement sending user 5.

Instead of simply sending response data to the announcement originating device 110a, the system may establish a synchronous communication channel between one or more response receiving devices (110b/110c) and the announcement originating device 110a. This enables one or more announcement receiving users (7/9) to communicate with the announcement sending user 5 in or substantially in real-time. It also enables one or more announcement receiving users (7/9) to have extended communications with the announcement sending user 5 in response to an announcement being output.

The system may operate using various components as described in FIG. 2. The various components illustrated FIG. 2 may be located on a same or different physical devices. Communication between various components illustrated in FIG. 2 may occur directly or across a network(s) 199.

The device 110 captures input audio 11, corresponding to a spoken utterance, using an audio capture component, such as a microphone or array of microphones. The device 110, using a wakeword detection component 220, processes audio data corresponding to the input audio 11 to determine if a keyword (e.g., a wakeword) is detected in the audio data.

Following detection of a wakeword, the device 110 sends audio data 211, corresponding to the utterance, to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211. The speech recognition component 250 sends text data generated thereby to a natural language component 260 of the speech processing component 240. The text data sent from the speech recognition component 250 to the natural language component 260 may include a top scoring textual interpretation of the audio data 211 or may include an N-best list including a group of textual interpretations of the audio data 211 and potentially their respective scores.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110, the server(s) 120, etc.) to complete the intent. For example, if the text data corresponds to "call mom," the natural language component 260 may determine the user intended to activate a telephone in his/her device and to initiate a call with a contact matching the entity "mom."

The server(s) 120 may include a user recognition component 295. The user recognition component 295 may take as input the audio data 211 and/or the text data output by the speech recognition component 250. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform natural language component 260 processes as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various applications 290 executed by the server(s) 120. However, it should be appreciated that the orchestrator component 230 may additionally or alternatively send output from the natural language component 260 to one or more remote devices executing applications that may thereby cause the remote devices to provide the server(s) 120 with content responsive to the command.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device). For example, a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 230 may choose which application 290 to send data to based on the output of the natural language component 260. In an example, the orchestrator component 230 may send data to a music playing application when the natural language component 260 outputs text data associated with a command to play music. In another example, the orchestrator component 230 may send data to a weather application when the natural language component 260 outputs text data associated with a command to output weather information. In yet another example, the orchestrator component 230 may send data to a search engine application when the natural language component 260 outputs text data associated with a command to obtain search results.

An application 290 may output text data, which the orchestrator component 230 may send to a text-to-speech component 280. The text-to-speech component 280 may synthesize speech corresponding to the text data input therein. The server(s) 120 may send audio data synthesized by the text-to-speech component 280 to the device 110 (or another device including a speaker and associated with the same user ID or customer ID) for output to the user.

The text-to-speech component 280 may perform speech synthesis using one or more different methods. In one method of synthesis called unit selection, the text-to-speech component 280 matches text data against a database of recorded speech. Matching units are selected and concatenated together to form audio data. In another method of synthesis called parametric synthesis, the text-to-speech component 280 varies parameters such as frequency, volume, and noise to create an artificial speech waveform output. Parametric synthesis uses a computerized voice generator, sometimes called a vocoder.

The server(s) 120 may additionally include a communications component 285. The communications component 285 may enable two or more user devices to communicate via the servers without the user devices detecting wakewords prior to sending audio data to another device. The communications component 285 enables users of devices to have synchronous communications (e.g., communicate as if they were via a telephone call). Once the server(s) 120 sends announcement content to recipient devices, the communications component may be invoked to enable recipient users to synchronously speak responses to the announcement originated user.

Figure 3:
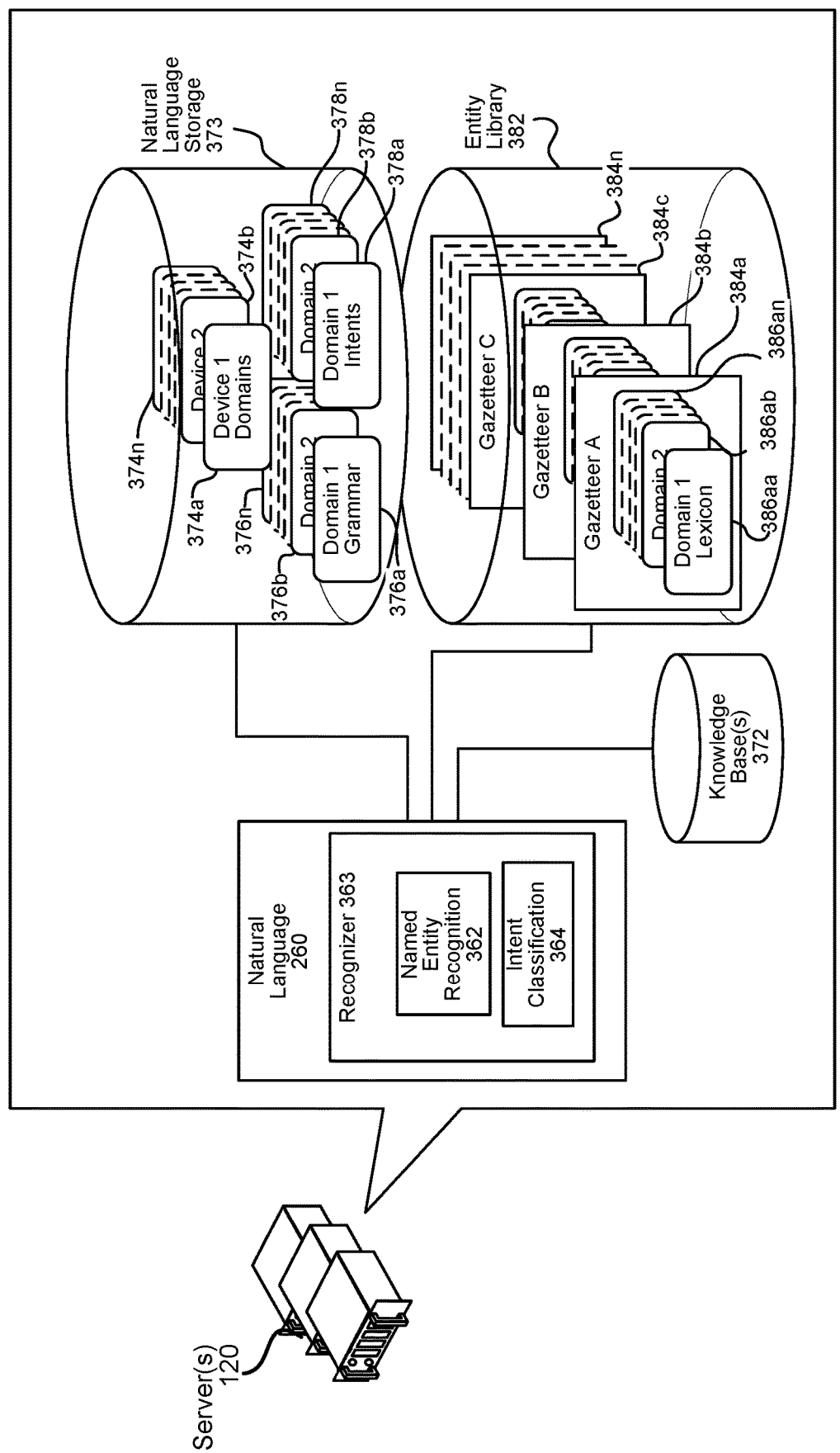
FIG. 3 is a conceptual diagram of how natural language processing is performed according to embodiments of the present disclosure.

FIG. 3 illustrates how natural language processing is performed on audio data. Generally, the natural language component 260 attempts to make a semantic interpretation of text represented in text data (e.g., output by the speech recognition component 250). That is, the natural language component 260 determines the meaning behind the text represented in text data based on the individual words. The natural language component 260 interprets text to derive an intent or a desired action from the user as well as the pertinent pieces of information in the text that allow a device (e.g., device 110) to complete that action. For example, if the natural language component 260 receives text data including text corresponding to "tell everyone dinner's ready," the natural language component 260 may determine that the user intended to output an announcement using devices associated with users corresponding to "everyone."

The natural language component 260 may process text data including several textual interpretations of a single utterance. For example, if the speech recognition component 250 outputs text data including an N-best list of textual interpretations, the natural language component 260 may process the text data with respect to all (or a portion of) the textual interpretations represented therein.

The natural language component 260 may annotate text represented in text data by parsing and/or tagging the text. For example, for the text "tell everyone dinner's ready," the natural language component 260 may tag "tell" as a command (e.g., to output an announcement) as well as tag "everyone" as an entity and target of the command, and "dinner's ready" as the content of the command.

The natural language component 260 may include one or more recognizers 363. Each recognizer 363 may be associated with a different "domain." A domain may correspond to a common group of information or activities, such as weather, music, video, communications, shopping, etc. The natural language component 260 may determine a domain potentially associated with a textual interpretation represented in text data input thereto in order to determine the proper recognizer 363 to process the textual interpretation. The natural language component 260 may determine a single textual interpretation is potentially associated with more than one domain. Multiple recognizers 363 may be functionally linked (e.g., a telephony/communications recognizer and a calendaring recognizer may utilize data from the same contact list).

If the natural language component 260 determines a specific textual interpretation is potentially associated with multiple domains, the recognizers 363 associated with the domains may process the specific textual interpretation in parallel. For example, if a specific textual interpretation potentially implicates both a communications domain and a music domain, a recognizer associated with the communications domain may process the textual interpretation in parallel, or substantially in parallel, with a recognizer associated with the music domain processing the textual interpretation. The output generated by each recognizer 363 may be scored, with the overall highest scored output from all recognizers ordinarily being selected to be the correct result.

The natural language component 260 may communicate with various storages to determine the potential domain(s) associated with a textual interpretation. The natural language component 260 may communicate with the natural language storage 373, which includes a databases of devices (374a-374n) identifying domains associated with specific devices. For example, the device 110 may be associated with domains for music, calendaring, contact lists, device-specific communications, etc. In addition, the natural language component 260 may communicate with an entity library 382, which includes database entries about specific services on a specific device, either indexed by Device ID, Speaker ID, or Household ID, or some other indicator.

Each recognizer 363 may include a named entity recognition (NER) component 362. The NER component 362 attempts to identify grammars and lexical information that may be used to construe meaning with respect to a textual interpretation input therein. The NER component 362 identifies portions of text represented in text data input into the natural language component 260 that correspond to a named entity that may be recognizable by the system. The NER component 362 (or other component of the natural language component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include domain-indexed lexical information associated with a particular user and/or device. For example, the Gazetteer A (384a) includes domain-index lexical information 386aa to 386an. A user's music-domain lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the domain (associated with the recognizer 363 implementing the NER component 362) to determine a mention of one or more entities in a textual interpretation input therein. In this manner, the NER component 362 identifies "slots" (i.e., particular words in a textual interpretation) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in speech about the particular domain (i.e., generic terms) to which the grammar model 376 relates, whereas the lexical information 386 is personalized to the user(s) and/or the device from which the audio data 211 originated. For example, a grammar model 376 associated with a shopping domain may include a database of words commonly used when people discuss shopping.

A downstream process called named entity resolution actually links a portion of text to an actual specific entity known to the system. To perform named entity resolution, the natural language component 260 may utilize gazetteer information (384a-384n) stored in an entity library storage 382. The gazetteer information 384 may be used to match text represented in text data output by the speech recognition component 250 with different entities, such as song titles, contact names, etc. Gazetteers may be linked to users (e.g., a particular gazetteer may be associated with a specific user's music collection), may be linked to certain domains (e.g., shopping, music, video, communications, etc.), or may be organized in a variety of other ways.

Each recognizer 363 may also include an intent classification (IC) component 364. The IC component 364 parses an input textual interpretation to determine an intent(s) of the domain associated with the recognizer 363 that potentially corresponds to the textual interpretation. An intent corresponds to an action to be performed that is responsive to the command represented by the textual interpretation. The IC component 364 may communicate with a database 378 of words linked to intents. For example, a music intent database may link words and phrases such as "quiet," "volume off," and "mute" to a "mute" intent. The IC component 364 identifies potential intents by comparing words in the textual interpretation to the words and phrases in an intents database 378 associated with the domain that is associated with the recognizer 363 implementing the IC component 364.

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of the text interpretation that the system believes corresponds to an entity. For example, a grammar framework 376 corresponding to an <Announcement> intent may correspond to textual interpretation sentence structures such as "Tell {Announcement Recipient Name}, {Announcement Content}," "Tell {Announcement Recipient Group Name}, {Announcement Content}," "Output {Announcement Content}," etc. However, to make resolution more flexible, grammar frameworks 376 may not be structured as sentences, but rather based on associating slots with grammatical tags.

For example, an NER component 362 may parse a textual interpretation to identify words as subject, object, verb, preposition, etc. based on grammar rules and/or models prior to recognizing named entities in the textual interpretation. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the domain associated with the recognizer 363 implementing the NER component 362, attempting to match words and phrases in the textual interpretation the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse a textual interpretation with heuristic grammar rules, or a model may be constructed using techniques such as hidden Markov models, maximum entropy models, log linear models, conditional random fields (CRF), and the like. For example, an NER component 362 implemented by a music domain recognizer 363 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve the slot/field using gazetteer information, the NER component 362 may search the database of generic words associated with the domain (in the knowledge base 372). For example, if the textual interpretation was "play songs by the rolling stones," after failing to determine an album name or song name called "songs" by "the rolling stones," the NER component 362 may search the domain vocabulary for the word "songs." In the alternative, generic words may be checked before the gazetteer information, or both may be tried, potentially producing two different results.

The natural language component 260 may tag the textual interpretation to attribute meaning to the textual interpretation. For example, the natural language component 260 may tag "play mother's little helper by the rolling stones" as: {domain} Music, {intent} Play Music, {artist name} rolling stones, {media type} SONG, and {song title} mother's little helper. For further example, the natural language component 260 may tag "play songs by the rolling stones" as: {domain} Music, {intent} Play Music, {artist name} rolling stones, and {media type} SONG.

Figure 4:
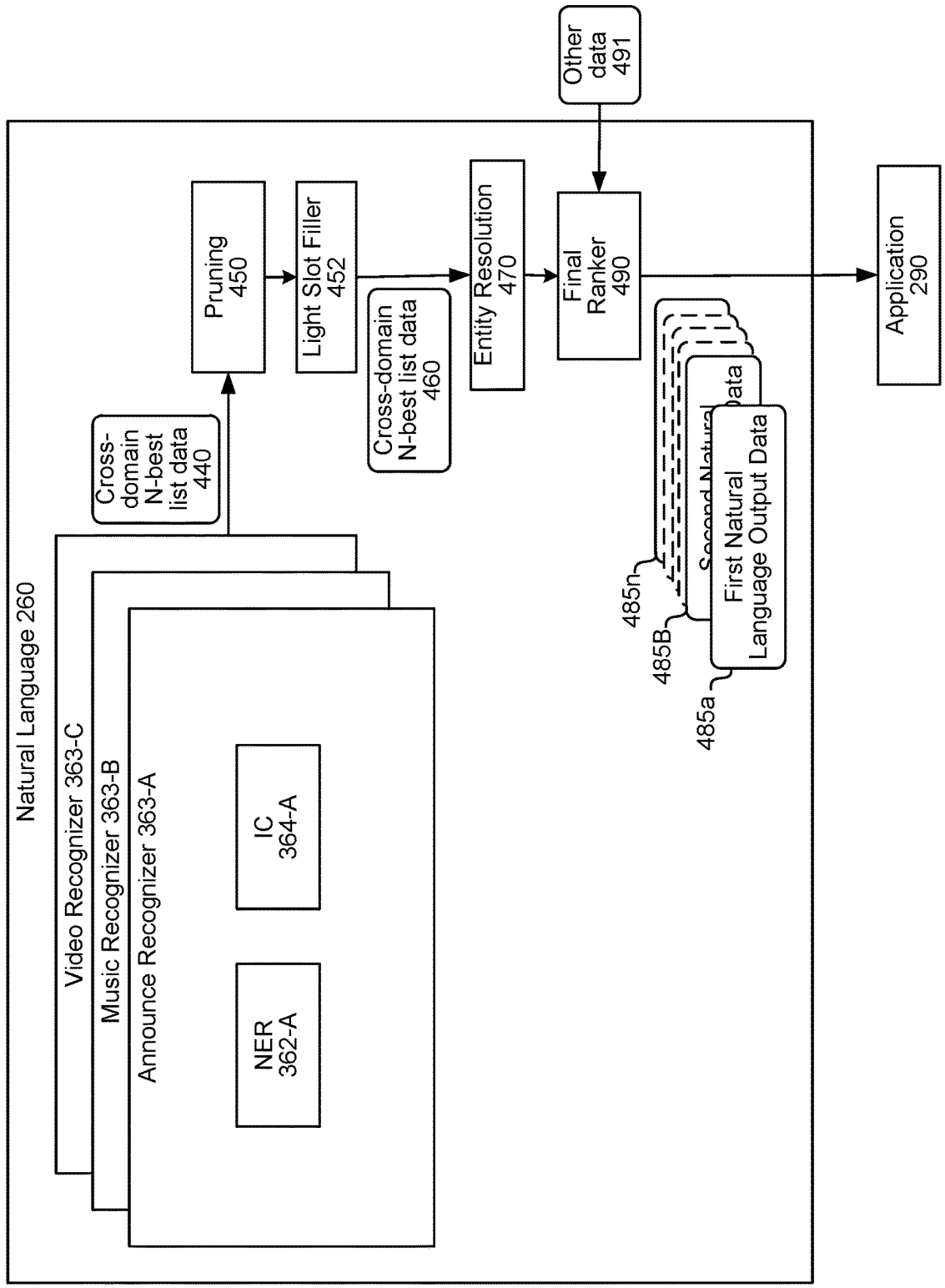
FIG. 4 is a conceptual diagram of how natural language processing is performed according to embodiments of the present disclosure.

Each recognizer 363 may output data corresponding to a single textual interpretation or to an N-best list of textual interpretations. The natural language component 260 may compile the output data of the recognizers 363 into a single cross-domain N-best list, and may send cross-domain N-best list data 440 (representing the cross-domain N-best list) to a pruning component 450 (as illustrated in FIG. 4). The tagged textual interpretations in the cross-domain N-best list data 440 may each be associated with a respective score indicating the tagged textual interpretation corresponds to the domain associated with the recognizer 363 from which the tagged textual interpretation was output. For example, the cross-domain N-best list data 440 may be represented as:

[0.95] Intent: <Announcement> AnnouncementRecipientName: Joe Smith

[0.70] Intent: <Announcement> AnnouncementRecipientName: Jo Smith

[0.01] Intent: <Announcement> AnnouncementRecipientName: Joan Smith

[0.01] Intent: <Announcement> AnnouncementRecipientName: JoAnne Smith

The pruning component 450 creates a new, shorter N-best list (i.e., represented in cross-domain N-best list data 460 discussed below) based on the cross-domain N-best list data 440. The pruning component 450 may sort the tagged textual interpretations represented in the cross-domain N-best list data 440 according to their respective scores.

The pruning component 450 may perform score thresholding with respect to the cross-domain N-best list data 440. For example, the pruning component 450 may select textual interpretations represented in the cross-domain N-best list data 440 associated with a score satisfying (e.g., meeting and/or exceeding) a score threshold. The pruning component 450 may also or alternatively perform number of textual interpretation thresholding. For example, the pruning component 450 may select the top scoring textual interpretation(s) associated with each different domain represented in the cross-domain N-best list data 440, with the new cross-domain N-best list data 460 including a total number of textual interpretations meeting or falling below a threshold number of textual interpretations. The purpose of the pruning component 450 is to create a new list of top scoring textual interpretations so that downstream (more resource intensive) processes may only operate on the tagged textual interpretations that most likely correspond to the command input to the system.

The natural language component 260 may also include a light slot filler component 452. The light slot filler component 452 can take text from slots represented in the textual interpretation(s) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a textual interpretation includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain N-best list data 460.

The natural language component 260 sends the cross-domain N-best list data 460 to an entity resolution component 470. The entity resolution component 470 can apply rules or other instructions to standardize labels or tokens from previous stages into an intent/slot representation. The precise transformation may depend on the domain (e.g., for a travel domain the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each textual interpretation represented in the cross-domain N-best list data 460. Specific intent/slot combinations may also be tied to a particular source, which may then be used to resolve the text. In the example "play songs by the stones," the entity resolution component 470 may reference a personal music catalog, Amazon Music account, user profile 502 (described herein), or the like. The entity resolution component 470 may output data including an altered N-best list that is based on the cross-domain N-best list represented in the cross-domain N-best list data 460, but also includes more detailed information (e.g., entity IDs) about the specific entities mentioned in the slots and/or more detailed slot data that can eventually be used by an application 290 which may be incorporated into the server(s) 120 components or pipeline or may be on a separate device(s) in communication with the server(s) 120. The natural language component 260 may include multiple entity resolution components 470 and each entity resolution component 470 may be specific to one or more domains.

The entity resolution component 470 may not be successful in resolving every entity and filling every slot represented in the N-best list represented in the cross-domain N-best list data 460. This may result in the entity resolution component 470 outputting incomplete results. The natural language component 260 may include a final ranker component 490, which may consider such errors when determining how to rank the tagged textual interpretations for potential execution. For example, if a book domain recognizer 363 outputs a tagged textual interpretation including a <ReadBook> intent flag, but the entity resolution component 470 cannot find a book with a title matching the text of the item, the final ranker component 490 may re-score that particular tagged textual interpretation to be given a lower score. The final ranker component 490 may also assign a particular confidence to each tagged textual interpretation input therein. The confidence score of a particular tagged textual interpretation may be affected by whether the tagged textual interpretation has unfilled slots. For example, if a tagged textual interpretation associated with a first domain includes slots that are all filled/resolved, that tagged textual interpretation may be associated with a higher confidence than another tagged textual interpretation including at least some slots that are unfilled/unresolved.

The final ranker component 490 may apply re-scoring, biasing, or other techniques to obtain the most preferred tagged and resolved textual interpretation. To do so, the final ranker component 490 may consider not only the data output by the entity resolution component 470, but may also consider other data 491. The other data 491 may include a variety of information. For example, the other data 491 may include application rating or popularity data. For example, if one application has a particularly high rating, the final ranker component 490 may increase the score of a textual interpretation(s) associated with or otherwise invoking that particular application. The other data 491 may also include information about applications that have been specifically enabled by the user. For example, the final ranker component 490 may assign higher scores to textual interpretations associated with or otherwise invoking enabled applications than textual interpretations associated with or otherwise invoking non-enabled applications. User history may also be considered, such as if the user regularly uses a particular supplemental application or does so at particular times of day. Date, time, location, weather, type of device 110, user ID, context, and other information may also be considered. For example, the final ranker component 490 may consider when any particular applications are currently active (e.g., music being played, a game being played, etc.).

Following final ranking, the natural language component 260 may output natural language output data 485. The natural language component 260 may be sent to the orchestrator component 230, which sends the natural language output data 485 to an appropriate application 290 (e.g., one configured to execute a command based on the textual interpretation represented in the natural language output data 485). The natural language output data 485 may include an indicator of the intent of the textual interpretation along with data associated with the intent, for example an indication that the intent is <PlayMusic> and the music to be played is "Adele." Multiple instances of natural language output data (e.g., 485a-485n) may be output for a given set of text data input into the natural language component 260.

The application(s) 290 provides the server(s) 120 with content responsive to the natural language output data 485 received thereby. If the content is text data that needs to be converted to speech, the orchestrator component 230 sends the content text data to the text-to-speech component 280.

Figure 5:
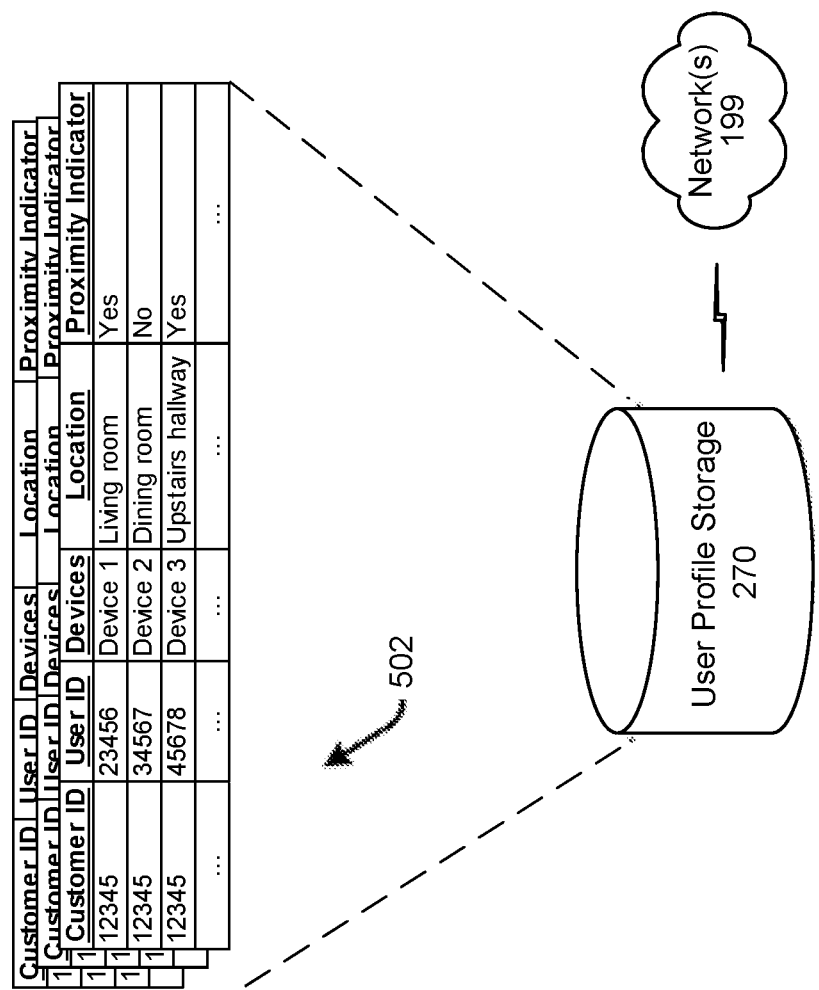
FIG. 5 illustrates data stored and associated with user profiles according to embodiments of the present disclosure.

FIG. 5 illustrates the user profile storage 270 that includes data regarding customer profiles as well as individual user profiles 502. For illustration, as shown in FIG. 5, each user profile 502 may include information indicating the devices associated with the profile, the locations of the devices, as well as whether the system detects the presence of a user nearby to the respective device (and potentially the identity of that user). Each user profile 502 may additionally include other data not explicitly illustrated.

FIGS. 6A and 6B illustrate the output of an announcement by multiple devices. A first device 110a receives (602) input audio corresponding to an utterance. The first device 110a generates input audio data corresponding to the input audio and sends (604) the input audio data to the server(s) 120.

The server(s) 120 performs (606) speech recognition processing on the input audio data to generate input text data. The server(s) 120 performs (608) natural language processing on the input text data. Natural language processing may determine a wakeword portion of the input text data and a payload portion of the input text data.

The server(s) 120 determines (610), based on the natural language processing, the payload corresponds to an intent to output an announcement. For example, the server(s) 120 may determine an intent to output an announcement based on payload corresponding to "tell everyone dinner's ready," "do your homework," etc. The server(s) 120 determines (612), based on the natural language processing, a portion of the payload (e.g., a portion of the input text data) corresponding to a destination of the announcement. The server(s) 120 then determines (614) devices associated with the destination.

The server(s) 120 determines (616), based on the natural language processing, a portion of payload (e.g., a portion of the input text data) corresponding to announcement content. For example, for the input text data of "tell everyone dinner's ready," the server(s) 120 may determine the announcement content corresponds to "dinner's ready."

The server(s) 120 generates (618) output audio data corresponding to the announcement content. The server(s) 120 may generate the output audio data by selecting a portion of the input audio data corresponding to the announcement content. Alternatively, the server(s) 120 may perform text-to-speech processing on the portion of the input text data corresponding to the announcement content to generate the output audio data.

The output audio data (illustrated at 620/622) may include a text-to-speech preface corresponding to "you have an announcement from [announcement originating user name]." The text-to-speech preface may be followed by the announcement content. The announcement content may either be the portion of the input audio data corresponding to the announcement or the announcement content may be text-to-speech content generated from the portion of the input audio data corresponding to the announcement. The announcement content may be followed by further text-to-speech content indicating the actions the announcement recipient user may take. For example, the further text-to-speech content may correspond to "are you ready," "do you want to call [announcement originating user name]," etc. The output audio data may include the various aforementioned text-to-speech content to facility a better user experience.

The server(s) 120 sends (620) the output audio data to a first device associated with the destination (e.g., the second device 110b) as well as sends (622) the output audio data to a second device associated with the destination (e.g., the third device 110c). It should be appreciated that while it is described that the server(s) 120 sends the output audio data to two devices, the server(s) 120 may send the output audio data to one or more than two devices. The server(s) 120 also sends (624) a first instruction to the first device associated with the destination (e.g., the second device 110b) as well as sends (626) a second instruction to the second device associated with the destination (e.g., the third device 110c). The first and second instructions may cause the second device 110b and the third device 110c to output audio corresponding to the output audio data as soon as possible after receiving the first instruction and the second instruction, respectively. Thus, the server(s) 120 may send the first instruction to the second device 110b and the second instruction to the third device 110c simultaneously, or substantially simultaneously, in order to cause the second device 110b and the third device 110c to output audio corresponding to the output audio data simultaneously, or substantially simultaneously.

The server(s) 120 may determine the destination of the announcement corresponds to a specific location. A user may speak an announcement including a portion indicating the announcement should be output by devices in a specific location. For example, individuals may be located throughout a house but the user may know that the intended recipients of the announcement are in a specific location of the house. The user may instruct the system which devices should be used to output the announcement content.

Figure 7:
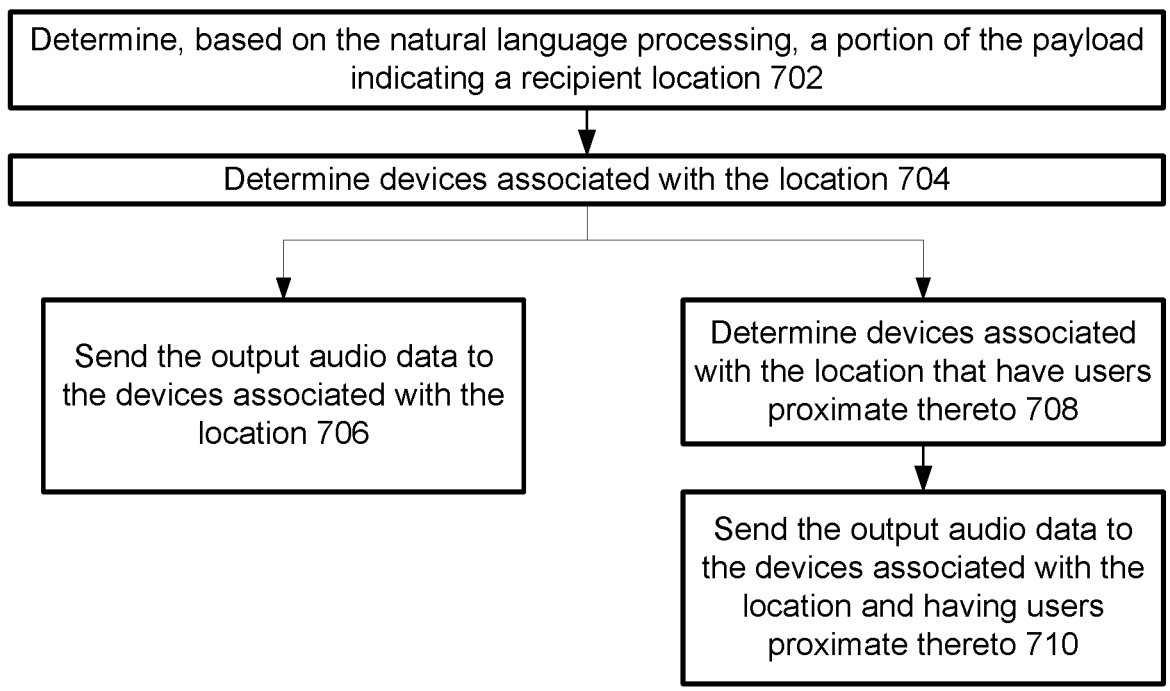
FIG. 7 is a process flow diagram illustrating the output of an announcement by multiple devices associated with a location according to embodiments of the present disclosure.

FIG. 7 illustrates the output of an announcement by multiple devices associated with a location. Based on natural language processing of input text data, the server(s) 120 determines (702) a portion of the payload (e.g., a portion of the input text data not corresponding to a wakeword) indicating a recipient location. For example, for payload corresponding to "announce upstairs that dinner's ready," the server(s) 120 may determine "upstairs" corresponds to a recipient location. For further example, for payload corresponding to "announce downstairs that dinner's ready," the server(s) 120 may determine "downstairs" corresponds to a recipient location. For yet further example, for payload corresponding to "announce in the family room that dinner's ready," the server(s) 120 may determine "family room" corresponds to a recipient location.

The server(s) 120 determines (704) devices associated with the recipient location. The spoken recipient location may correspond to a pre-set category of devices. For example, a system profile associated with the device (e.g., device 110a) may include information associating devices with locations. If the profile does not include information associating devices with locations, the server(s) 120 may determine the devices associated with the location using different methodology. For example, the server(s) 120 may determine devices associated with the recipient location based on device names represented in profiles of the system (e.g., the user profile storage 270 may indicate a "basement device"). For further example, the server(s) 120 may determine devices associated with the recipient location based on device groups represented in profiles of the system (e.g., the user profile storage 270 may indicate a first device and a second device are located in a "basement"). Yet further, the server(s) 120 may determine devices associated with the recipient location based on Internet Protocol (IP) addresses and/or media access control (MAC) addresses of different routers indicating different locations (e.g., vacation home, main home, etc.). Additionally, the server(s) 120 may determine devices associated with the recipient location based on Bluetooth Low Energy (BLE) indicating nearby users coupled with global positioning system (GPS) indicating representing a physical location of the device (e.g., beach house, car, etc.).

The server(s) 120 may send (706) the output audio data to all the devices associated with the determined recipient location. Alternatively, the server(s) 120 may determine (708) the devices associated with the determined recipient location that have users proximate thereto, and send (710) the output audio data to only the devices that are both associated with the determined recipient location as well as proximate to one or more users.

The system may determine a user a proximate a device using various techniques. In one example, a device may capture one or more images, process image data corresponding to the one or more images to determine a representation of a user, and, based thereon, output a presence indicator representing that a user is proximate to the device. The device may output a presence indicator to the system in such as case. The device may output the presence indicator until a representation of a user is no longer determined in image data corresponding to one or more subsequently captured images. Alternatively, the device may send the image data to the server(s) 120. The server(s) 120 may process the image data to determine a representation of a user and generate a presence indicator representing a user is proximate to the device. The server(s) 120 may delete the presence indicator after subsequent image data is processed to determine the absence of a representation of a user. In another example, a device may capture audio, process audio data corresponding to the audio to determine user speech, and, based thereon, output a presence indicator representing that a user is proximate to the device. The device may output the presence indicator to the system until user speech is no longer determined in audio data corresponding to subsequently captured audio. Alternatively, the device may send the audio data to the server(s) 120. The server(s) 120 may processing the audio data to determine user speech and generate a presence indicator representing a user is proximate to the device. The server(s) 120 may delete the presence indicator after subsequent audio data is processed to determine the absence of user speech.

The server(s) 120 may also determine the destination of the announcement corresponds to specific recipient users. A user may also speak an announcement that should be output by devices having specific users proximate thereto. For example, individuals may be located throughout a house but the user may only want the announcement output to a specific portion of the individuals. The user may instruct the system regarding which recipient users to which the system should output the announcement. The system may then cause only devices proximate to the recipient users to output the announcement.

Figure 8:
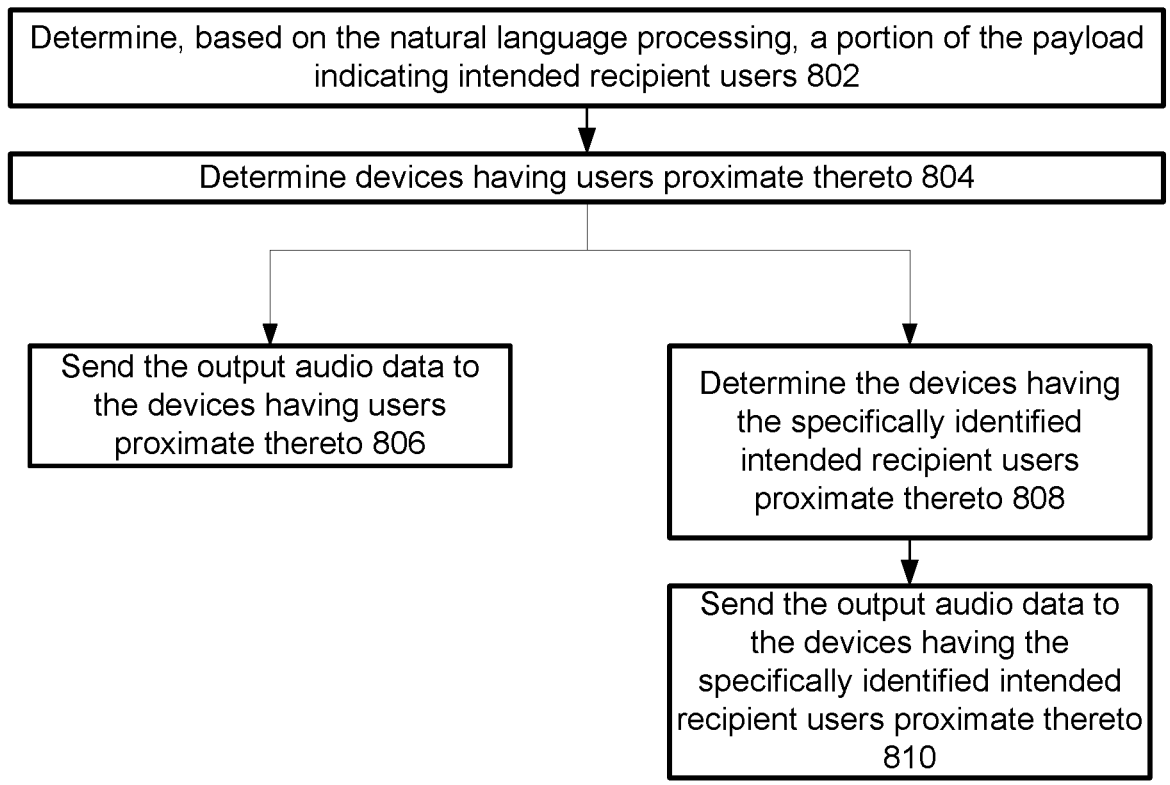
FIG. 8 is a process flow diagram illustrating an output of an announcement to multiple devices proximate to intended recipient users according to embodiment of the present disclosure.

FIG. 8 illustrates the output of an announcement by multiple devices proximate to intended recipient users. Based on natural language processing of input text data, the server(s) 120 determines (802) a portion of the payload (e.g., a portion of the input text data not corresponding to a wakeword) indicating intended recipient users. For example, for payload corresponding to "tell the kids to do their homework," the server(s) 120 may determine "kids" corresponds to the intended recipient users. For further example, for payload corresponding to "tell everyone dinner's ready," the server(s) 120 may determine "everyone" corresponds to the intended recipient users. For yet further example, for payload corresponding to "tell the guys I am putting the game on in 15 minutes," the server(s) 120 may determine "guys" (which may be a pre-established group of users indicated in a system profile associated with the announcement originating device) corresponds to the intended recipient users.

The server(s) 120 determines (804) devices, represented in the profile associated with the announcement originating device, having users proximate thereto. If the server(s) 120 determines the payload indicates the intended recipient users are "everyone," the server(s) 120 sends (806) the output audio data to all the devices having users proximate thereto. If the server(s) 120 determines the payload indicates specific intended recipients (e.g., John, Bob, husband, wife, etc.) or a type of recipient (e.g., kids, etc.), the server(s) 120 determines (808) the devices having the specifically indicated recipient users or type of recipient users proximate thereto. Such determinations may include comparing representations of users in image data to stored representations associated with specific users or types of users (e.g., stored "kid" representation, stored "adult" representation, etc.). Such determinations may also or alternatively include comparing speech characteristics of users in audio data to stored speech characteristics associated with specific users or types of users (e.g., stored "kid" speech characteristics, stored "adult" speech characteristics, etc.). The server(s) 120 may then send (810) the output audio data to the devices having the user specifically indicated in the payload proximate thereto.

In some instances, the profile associated with the device that originated the announcement may not include devices associated with the intended recipients. This may be true, for example, for a command corresponding to "tell the guys I am putting the game on in 15 minutes." If the server(s) 120 is unable to determine devices, in the profile, proximate to the intended recipient users, the server(s) 120 may access an electronic calendar associated with the profile to determine an event or meeting including participants. If the input command includes an indication of a time, the server(s) 120 may look to the electronic calendar for an event or meeting associated with the time. The server(s) 120 may then determine if the participants of the event or meeting are associated with system profiles representing devices. The server(s) 120 may then determine if the devices represented in those system profiles are outputting proximity indicators. If they are, the server(s) 120 can determine those devices to be the devices proximate to the intended recipient users.

In other instances, the profile associated with the device that originated the input audio data may include user provided groups of users, such as "the guys." Each user in a group may be associated with a device. In this case, the server(s) 120 may determine whether the devices associated with the users of the pre-established group are proximate to the intended recipient users and, based therein, send the output audio data to those devices.

Figure 9:
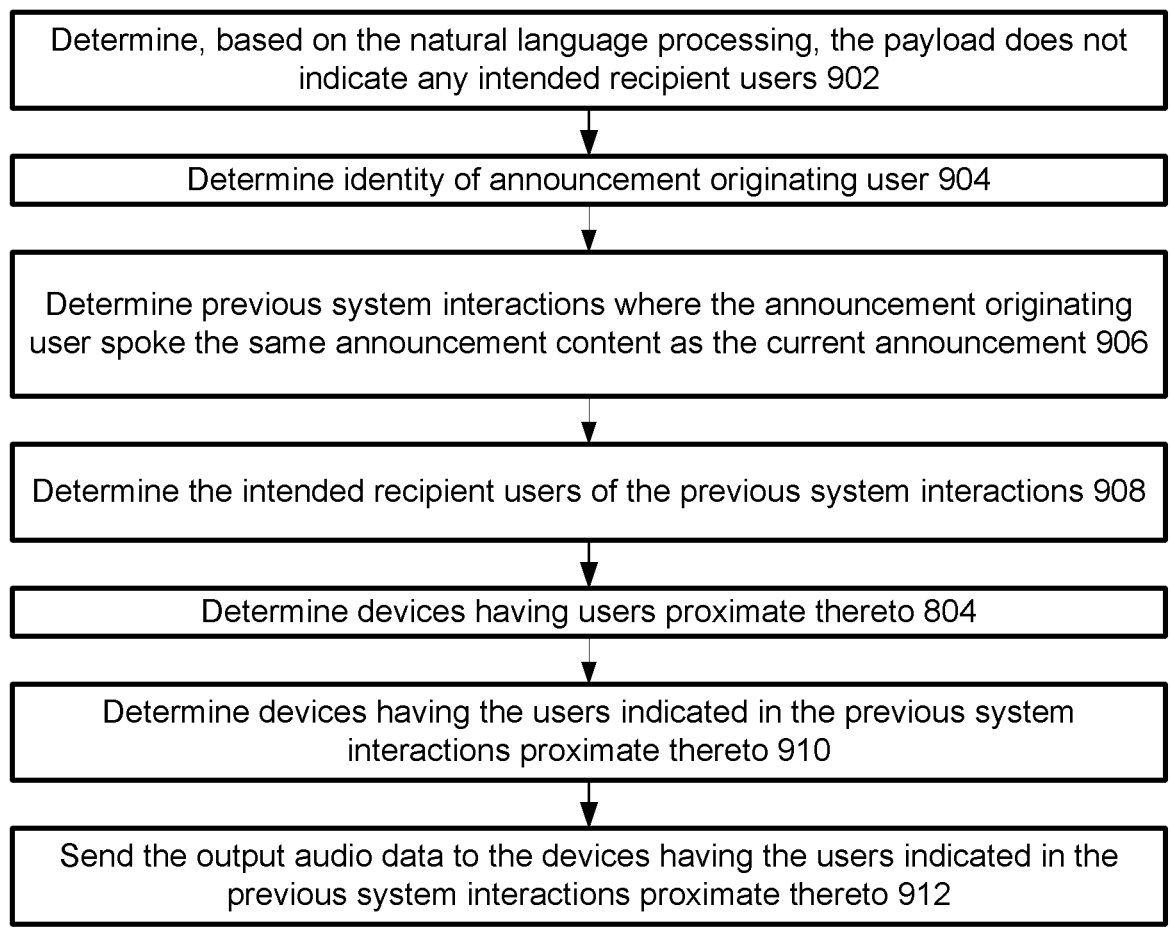
FIG. 9 is a process flow diagram illustrating the output of an announcement to multiple devices proximate specific intended recipient users when the announcement does not specify the intended recipients according to embodiments of the present disclosure.

The server(s) 120 may additionally determine the destination of the announcement when the announcement fails to specify the intended recipients (as illustrated in FIG. 9). The server(s) 120 may determine (902), based on the natural language processing, that the payload (e.g., the portion of the input text data not corresponding to the wakeword) does not indicate any intended recipient users. For example, the payload may correspond to "dinner's ready."

The server(s) 120 determines (904) an identity of the announcement originating user. For example, the server(s) 120 may compare speech characteristics in the input audio data to stored speech characteristics associated with users of the system (and, more narrowly, with users associated with the device that originated the announcement). The server(s) 120 may then determine (906) a previous system interactions where the announcement originating user spoke the same announcement content as the current announcement content. The server(s) 120 determines (908) the intended recipient users of the previous system interactions. For example, the current announcement may correspond to "dinner's ready" and the previous system interactions may corresponds to "tell everyone dinner's ready," "tell John and Joe dinner's ready," "tell the kids dinner's ready," etc. The server(s) 120 determines (804) devices having users proximate thereto, determines (910) the devices having the users indicated in the previous interactions proximate thereto, and sends (912) the output audio data to the devices having the users indicated in the previous interactions proximate thereto.

When the server(s) 120 determines the payload does not indicate any intended recipient users, the server(s) 120 may cause announcement content to be output to one or more devices on the same wireless network or at the same GPS location as the announcement originating device.

Figure 10:
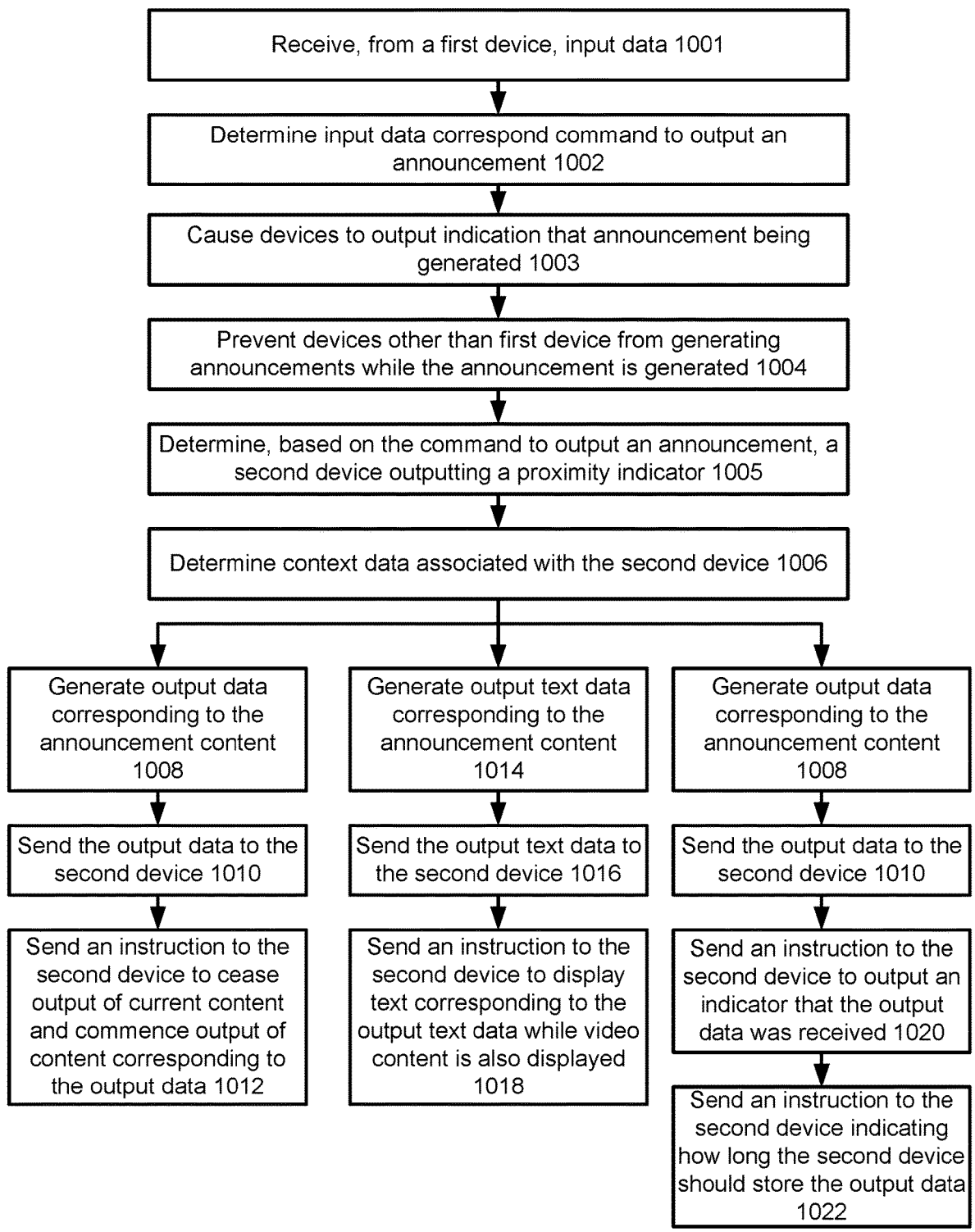
FIG. 10 is a signal flow diagram illustrating output of an announcement by a device based on context information according to embodiments of the present disclosure.

FIG. 10 illustrates the output of an announcement, or an indication thereof, by a device based on context information. The server(s) 120 receives (1001) input data from the first device 110*a*. The server(s) 120 determines (1002) the input data corresponds to a command to output an announcement. For example, the first device 110*a* may receive an input corresponding to a user press of a button, and the server(s)

120 may determine data indicating the press of the button corresponds to a command to output an announcement. For further example, the first device 110a may correspond to a doorbell and the server(s) 120 may determine activation of the doorbell corresponds to a command to output an announcement corresponding to "someone's at the door." In another example, the first device 110a may capture audio representing a knock of a door, and the server(s) 120 may determine audio data representing the knock corresponds to a command to output an announcement corresponding to "someone's at the door." The server(s) 120 may cause (1003) devices, associated with the same profile as the first device 110a, to output indication that an announcement is being generated based on the speech processing indicating the command corresponds to an announcement. The indication may be a visual indication, such as the activation of a light ring or other light on the devices. Moreover, the server(s) 120 may prevent (1004) the devices, other than the first device 110a, associated with the profile from generating announcements while the announcement is being generated. For example, once the server(s) 120 determines the input audio data corresponds to an announcement, the server(s) 120 may cause the other devices to disable their microphones until the devices (or a portion thereof) output content corresponding to the currently generated announcement originated from the first device 110a. For further example, once the server(s) 120 determines the input audio data corresponds to an announcement and once the server(s) 120 determines the announcement recipient devices, the server(s) 120 may ignore input audio data received from the announcement recipient devices for a period of time (e.g., a time period starting when the server(s) 120 determines the input corresponding to an announcement and ending when the announcement recipient devices finish outputting announcement content). This enables the server(s) 120 to only processing one announcement per profile of the system at any given time.

The server(s) 120 determines (1005) a second device 110b outputting a proximity indicator based on the input audio data corresponding to a command to output an announcement. The server(s) 120 also determines (1006) context data associated with the second device 110b. The context data may be received from a variety of sensors.

The context data may indicate the second device 110b is presently outputting content (e.g., audible and/or visual content). The announcement may be urgent (e.g., may correspond to "the house is on fire"). In such a situation, the server(s) 120 may cause output data corresponding to the announcement to be output immediately. The server(s) 120 may generate (1008) output data corresponding to the announcement content and send (1010) the output data to the second device 110b. The server(s) 120 may also send (1012) an instruction to the second device 110b to cease output of the current content and commence output of the content corresponding to the output data. For example, the instruction may cause the second device 110b to cease output of currently output audio and commence output of audio corresponding to output audio data. For further example, the instruction may cause the second device 110b to cease display of currently displayed content (e.g., text, an image, a video, etc.) and commence display of content (e.g., text) corresponding to output text data.

The context data may indicate the second device 110b is presently outputting multimedia content (e.g., video content with corresponding audio). The server(s) 120 may generate (1014) output text data corresponding to the announcement content and send (1016) the output text data to the second device 110b. The server(s) 120 may also send (1018) an instruction to the second device 110b to display text corresponding to the output text data while the video content is still displayed. For example, the instruction may cause the second device 110b to display the text as a banner in an upper portion, lower portion, or other portion of a display that does not fully interfere with a user of the second device 110b watching the video content.

The context data may indicate the user is unavailable. For example, the server(s) 120 may determine a user of the second device 110b is unavailable based on a location of the second device 110b (e.g., the second device 110b is a smart watch located at a work of the user). For further example, the server(s) 120 may determine a user of the second device 110b is unavailable based on the second device 110b currently outputting content, such as music or video content. Yet further, for example, the server(s) 120 may determine a user of the second device 110b is unavailable based on the second device 110b being in motion at a speed above a threshold speed (e.g., indicating the user is presently driving a vehicle). Based on the server(s) 120 determining the user is unavailable, the server(s) 120 generates (1008) output data corresponding to the announcement content and sends (1010) the output data to the second device 110b. The server(s) 120 also sends (1020) an instruction to the second device 110b to output an indicator that the output data was received.

The instruction may cause the second device 110b to output a tactile indicator (e.g., cause the second device 110b to vibrate). The instruction may also cause the second device 110b to visually output the indicator. For example, the instruction may cause a light ring or other visual indication component of the second device 110b to light up using a certain color, motion, etc. to indicate the output data was received. The visual indicator can further be configured to indicate to a user the urgency or priority of the output data. The visual indicator may be configured to output different colors and/or motions, with each color and/or motion representing a different priority. For example, output data corresponding to "the house is on fire" may be considered to be of high priority while output data corresponding to "dinner's ready" may be considered to have less of a priority.

Priority of an announcement may be based on presence data. If an announcement is output by two recipient devices to two different users and the announcement originating device shortly thereafter detects the presence of the two different users, the system may determine that specific announcement is of high priority. For example, the system may determine an announcement corresponding to "dinner's ready" is of high priority if shortly after outputting the announcement to two users, the two users are detected by the announcement originating device in a kitchen. Conversely, if an announcement is output by two devices to two different users and the device originating the announcement does not detect the presence of the two users within a threshold amount of time, the system may determine that specific announcement is of low priority.

The server(s) 120 may cause the second device 110b to delete the output data after a predetermined period of time if the user of the second device 110b does not cause the second device 110b to output the output data within the predetermined period of time. The predetermined period of time may be configured based on a potential length of relevancy of the announcement content. For example, the second device 110b may store output data corresponding to "dinner's ready" for five (5) minutes, the second device 110b may store output data corresponding to "grandma is on the phone" for thirty (30) seconds, etc. The server(s) 120 may send (1022) the second device 110*b* a second instruction indicating how long the second device 110*b* should store the output data.

If the second device 110*b* receives an indication, prior to deleting the output data, from a user thereof to output the output data, the second device 110*b* may output content indicating when the output data was received by the first device 110*a* as well as content corresponding to the output data. For example, the second device 110*b* may output "announcement received 30 seconds ago, dinner's ready."

As described, the second device 110*b* may be instructed to store the output data for a predetermined period of time. In some instances, the device 110*b* may be outputting content when the output data is received. The second device 110*b* may be configured to immediately output the output data once the second device 110*b* has completed output of the content, provided that the second device 110*b* is still storing the output data (e.g., provided that the predetermined period of time for storing the output data has not expired). For example, the second device may be instructed to store output data for five (5) minutes. If the second device 110*b* receives the output data while the second device 110*b* is outputting a song and the second device 110*b* finishes outputting the song within three (3) minutes, the second device 110*b* may immediately thereafter output the output data. Conversely, if the second device 110*b* receives the output data while the second device 110*b* is outputting a song and the second device 110*b* does not finish the song with the five (5) minutes it is instructed to store the output data, the second device 110*b* may not output the output data because the second device 110*b* would have deleted the output data while the song was still being output. If the second device 110*b* deletes the output data prior to it being output, the second device 110*b* may cease output of the indicator representing the output data was received by the second device 110*b*.

In other instances, the server(s) 120 may store the output data for a predetermined amount of time. If the second device 110*b* finishes outputting the content prior to the predetermined amount of time, the server(s) 120 may send the output data to the second device 110*b* for output to the user. Conversely, if the second device 110*b* finishes outputting the content after the predetermined amount of time, the server(s) 120 may send an indication to the second device 110*b* that the output data has been deleted, provided the second device 110*b* has requested the output data. If the second device 110*b* does not send a request for the output data to the second device 110*b*, the server(s) 120 may simply delete the output data without sending an indication of such to the second device 110*b*.

FIGS. 11A and 11B illustrate the capture and output of responses to an announcement. The server(s) 120 sends (620) the output audio data to the second device 110*b* as well as sends (622) the output audio data to the third device 110*c*. The server(s) 120 also sends (624) the first instruction to the second device 110*b* as well as sends (626) the second instruction to the third device 110*c*.

The second device 110*b* outputs (1106) first audio corresponding to the first output audio data based on the first instruction and the third device 110*c* outputs (1108) second audio corresponding to the second output audio data based on the second instruction. If the first instruction and the second instruction cause the second device 110*b* and the third device 110*c* to output the announcement content immediately upon receipt of same, and the server(s) 120 sends the first and second instructions to the second device 110*b* and the third device 110*c* at the same time respectively, the second device 110*b* and the third device 110*c* may output the announcement content at or substantially at the same time.

The second instruction and the third instruction may cause the second device 110*b* and the third device 110*c* to enable their respective microphones to capture responses to the announcement after the devices (110*b*/110*c*) complete output of the announcement. The second and the third instructions may indicate that audio data corresponding to audio captured by re-enabled microphones should be sent to the server(s) 120 even if the devices (110*b*/110*c*) do not first detect the presence of a wakeword in the audio data. For example, the second and the third instructions may indicate that the first thirty (30) second of audio captured after a microphone is enabled should be sent to the server(s) 120 regardless of whether a wakeword is present in the captured audio. Thus the second instruction and the third instruction may cause the second device 110*b* and the third device 110*c* respectively to enable their respective microphones for a predetermined amount of time (e.g., a few seconds). This enables users of the second device 110*b* and the third device 110*c* to simply speak responses to the announcement content without first needing to speak a wakeword. Thus, the second device 110*b* enables (1110) one or more microphones upon outputting the announcement content and the third device 110*c* enables (1112) one or more microphones upon outputting the announcement content. If the second device 110*b* and the third device 110*c* output the same announcement content at or substantially at the same time, the second device 110*b* and the third device 110*c* may enable their respective microphones at or substantially at the same time.

The system may cause the first device 110*a*, which originated the announcement, to output responses to the announcement as they are received by the system. For example, the second device 110*b* may receive (1114) input audio corresponding to a response to the announcement content by a user of the second device 110*b*. The second device 110*b* may send (1116) input audio data corresponding to the received input audio to the server(s) 120. The server(s) 120 may send (1118) the input audio data to the first device 110*a*, which outputs (1120) audio corresponding to the input audio data. For further example, the third device 110*c* may receive (1122) input audio corresponding to a response to the announcement content by a user of the third device 110*c*. The third device 110*c* may send (1124) input audio data corresponding to the received input audio to the server(s) 120. The server(s) 120 may send (1126) the input audio data to the first device 110*a*, which outputs (1128) audio corresponding to the input audio data.

As indicated, the system may cause the first device 110*a* to output responses as they are received by other devices (e.g., the second device 110*b* and the third device 110*c*). The server(s) 120 may not process the input audio data prior to sending it to the first device 110*a* (e.g., the server(s) 120 may simply forward input audio data to the first device 110*a* upon the server(s) 120 receiving the input audio data). Thus, it should be appreciated that if the second device 110*b* and the third device 110*c* receive respective input audio at or substantially at the same time, the first device 110*a* may output audio corresponding to the responses provided to the second device 110*b* and the third device 110*c* at or substantially at the same time.

As described above, the system may receive responses to the announcement in the form of user speech. Alternatively, a device local to a user may visually display virtual buttons corresponding to pre-established responses to the announcement on a touch sensitive interface of the device. FIGS. 12A and 12B illustrate the output of announcement content and capture of responses to the announcement content via a display of a device.

Upon the server(s) 120 determining announcement content, the server(s) 120 determines (1202) pre-established responses associated with the announcement content. The server(s) 120 may determine the pre-established responses based on the announcement content. For example, for announcement content requesting the presence of users (e.g., announcement content corresponding to "dinner's ready," "the meeting is starting," etc.), the server(s) 120 may determine pre-established responses corresponding to "on my way," be there shortly," be there in five minutes," etc. The server(s) 120 may also determine the pre-established responses based on responses previously provided for the announcement content. For example, the system may output announcement content corresponding to "what do you want to drink with dinner." The system may receive responses corresponding to "milk," "water," "soda," etc. Thereafter, when the system determines subsequent announcement content corresponds to "what do you want to drink with dinner," the server(s) 120 may determine the pre-established responses previously given for the announcement content (e.g., "milk," "water," "soda," etc.).

The server(s) 120 sends (1204) the pre-established response data corresponding to the determined pre-established responses to a device (e.g., the second device 110b). The server(s) 120 also sends (1206) an instruction to the second device 110b that instructs the second device 110b to display text corresponding to the announcement content as well as present virtual buttons corresponding to the pre-established responses.

The second device 110b displays (1208), on a touch screen of the second device 110b, text corresponding to the announcement content as well as virtual buttons corresponding to the pre-established responses. If the system received a pre-established response as audio (e.g., user speech), upon determining the pre-established response is applicable to the announcement content, the server(s) 120 performs speech recognition on audio data corresponding to the pre-established response to generate pre-established response data including text that may be presented by the second device 110b as text of a virtual button.

The second device 110b receives (1210) a touch input corresponding to one of the displayed virtual buttons. The second device 110b sends (1212) response text data including text that was displayed on the selected virtual button to the server(s) 120.

The server(s) 120 may perform (1214) text-to-speech processing on the response text data to generate response audio data. Alternatively, the server(s) 120 may determine (1216) pre-stored response audio data including audio corresponding to previously received response speech corresponding to the currently selected response text. The server(s) 120 sends (1218) the response audio data to the first device 110a that originated the announcement content. The first device 110a outputs (1220) response audio corresponding to the response audio data.

It has been described that an announcement receiving user may select a virtual button to indicate their selection of a pre-established response. Alternatively, the announcement receiving user may speak a pre-established response to the device 110b. The system may then process the spoken pre-established response according to the teachings herein above to convey the spoken pre-established response to the announcement originating user.

As described above, responses to announcement content may be output as then are received by the system. As illustrated in FIGS. 13A through 13D, responses may alternatively be output based on an announcement originator user's instruction.

The second device 110b sends (1116) input audio data corresponding to a first response to the server(s) 120. The third device 110c sends (1124) input audio data corresponding to a second response to the server(s) 120.

The server(s) 120 generates (1301) output audio data summarizing the received responses. The output audio data may indicate the devices from which responses were received. For example, the output audio data may include audio corresponding to "responses were provided by your living room device and your hallway device." The output audio data may also indicate the user that provided the responses. For example, the output audio data may include audio corresponding to "responses were provided by John and Joe." The server(s) 120 sends (1302) the output audio data to the first device 110a (e.g., the device that originated the announcement to which the responses relate).

The first device 110a outputs (1304) audio corresponding to the output audio data. The first device 110a also receives (1305) input audio corresponding to an utterance. The first device 110a sends (1306) input audio data corresponding to the input audio to the server(s) 120.

The server(s) 120 performs (1308) speech processing on the input audio data to determine an indication to output a portion of the received responses (e.g., the input audio data corresponding to a response received from the second device 110b). For example, the input audio data may include audio corresponding to "tell me the response provided to the living room device." Alternatively, the input audio data may indicate the user's response that should be output. For example, the input audio data may include audio corresponding to "tell me John's response." The input audio data may also include a summary of the responses, such as 4 yesses and 1 no. The server(s) 120 sends (1310) input audio data corresponding to the response, indicated in the audio data received from the device 110a, to the device 110a. The device 110a outputs (1312) audio corresponding to the input audio data corresponding to the response.

Steps 1305 through 1312 may be performed more than once (e.g., when the user that originated the response requests the system to output more than one provided response).

The server(s) 120 may also perform (1314) speech recognition processing on the first input audio data received from the second device 110b to generate first input text data corresponding thereto. The server(s) also performs (1316) speech recognition processing on the second input audio data received from the third device 110c to generate second input text data corresponding thereto. The server(s) 120 sends (1318) the first and second input text data to the first device 110a. The server(s) 120 also sends (1320) an instruction to the first device 110a to display text corresponding to the first and second input text data.

Figure 14:
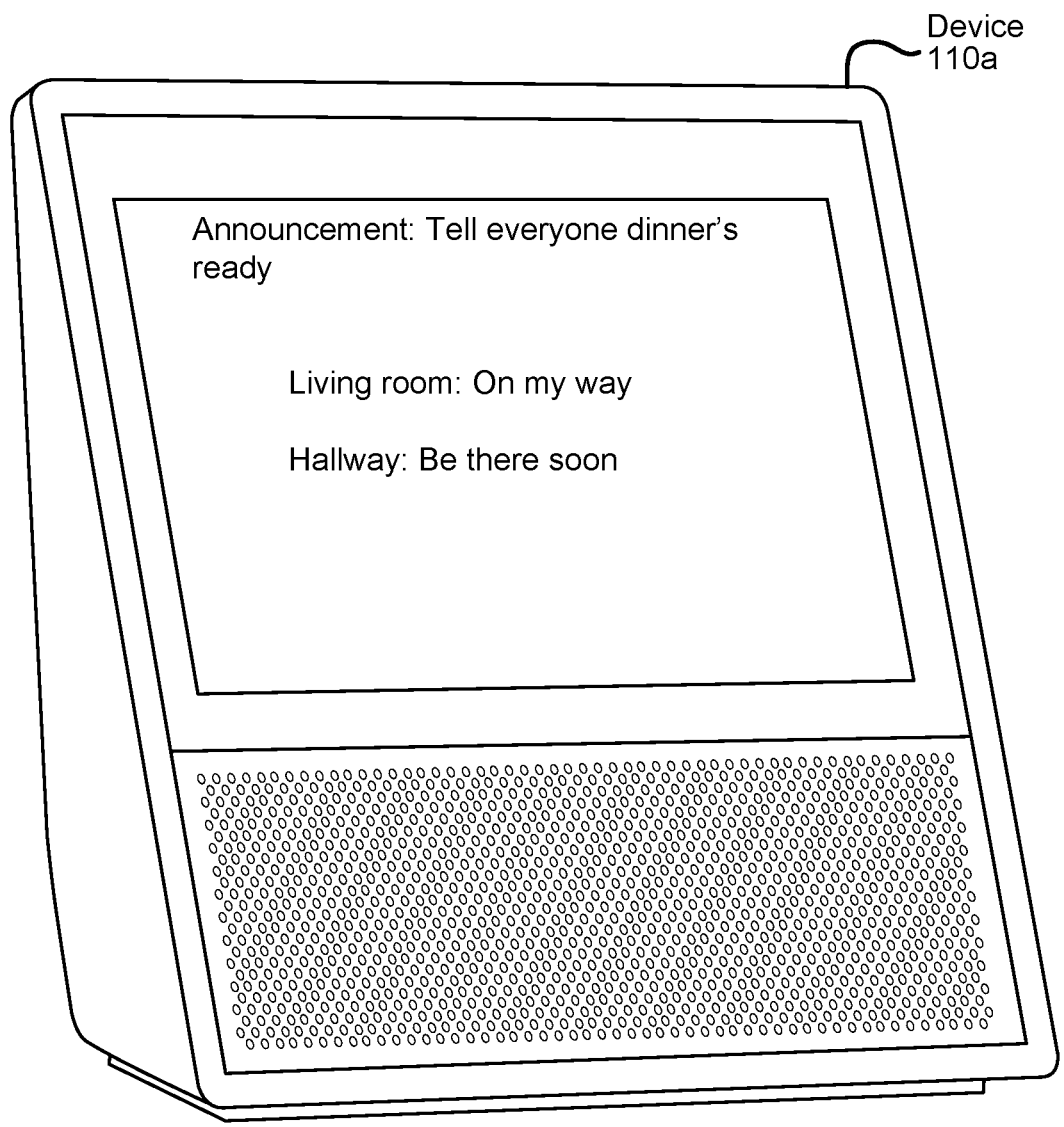
FIG. 14 illustrates a device displaying responses to an announcement according to embodiments of the present disclosure.
Figure 15:
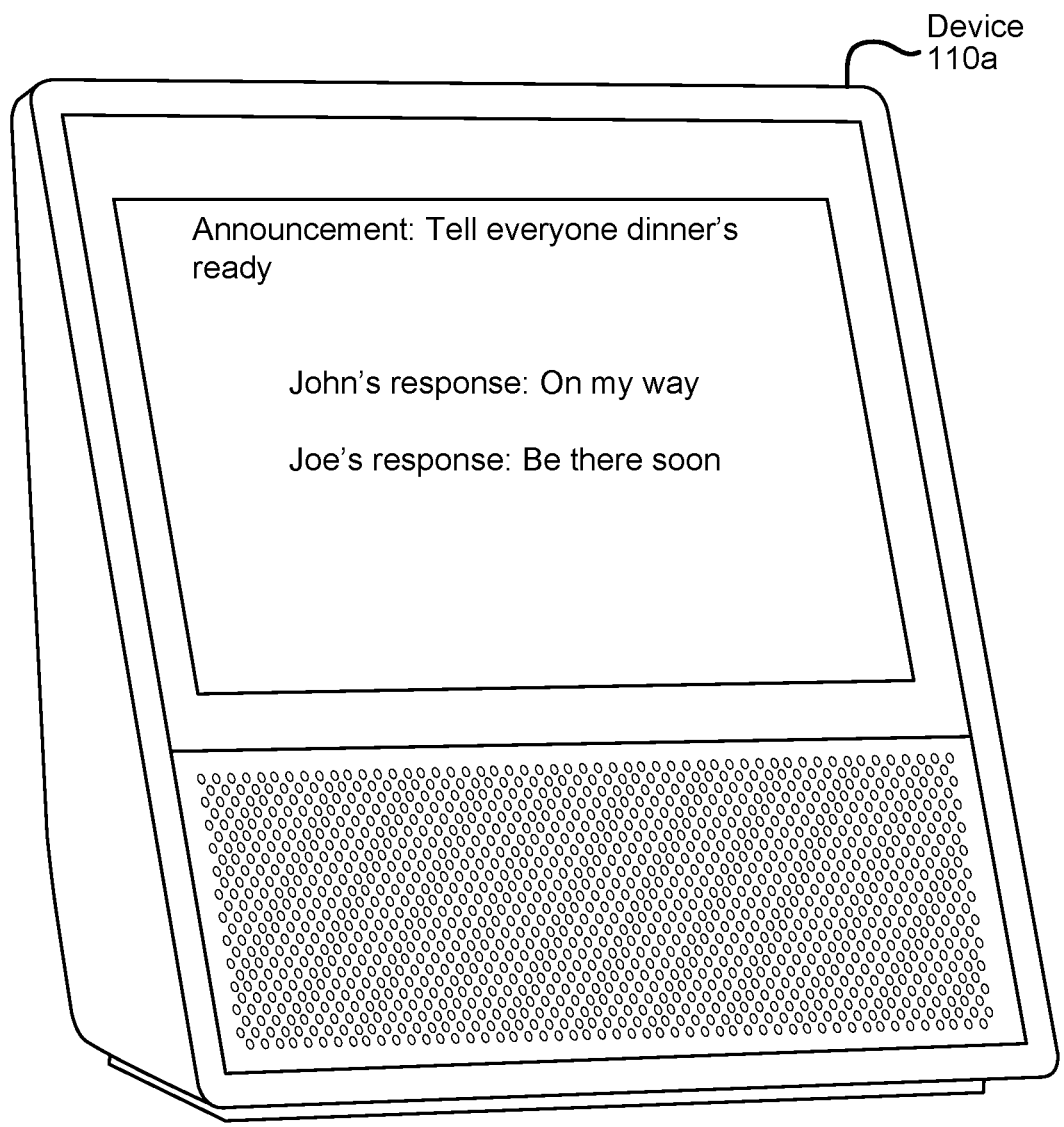
FIG. 15 illustrates a device displaying responses to an announcement according to embodiments of the present disclosure.
Figure 16:
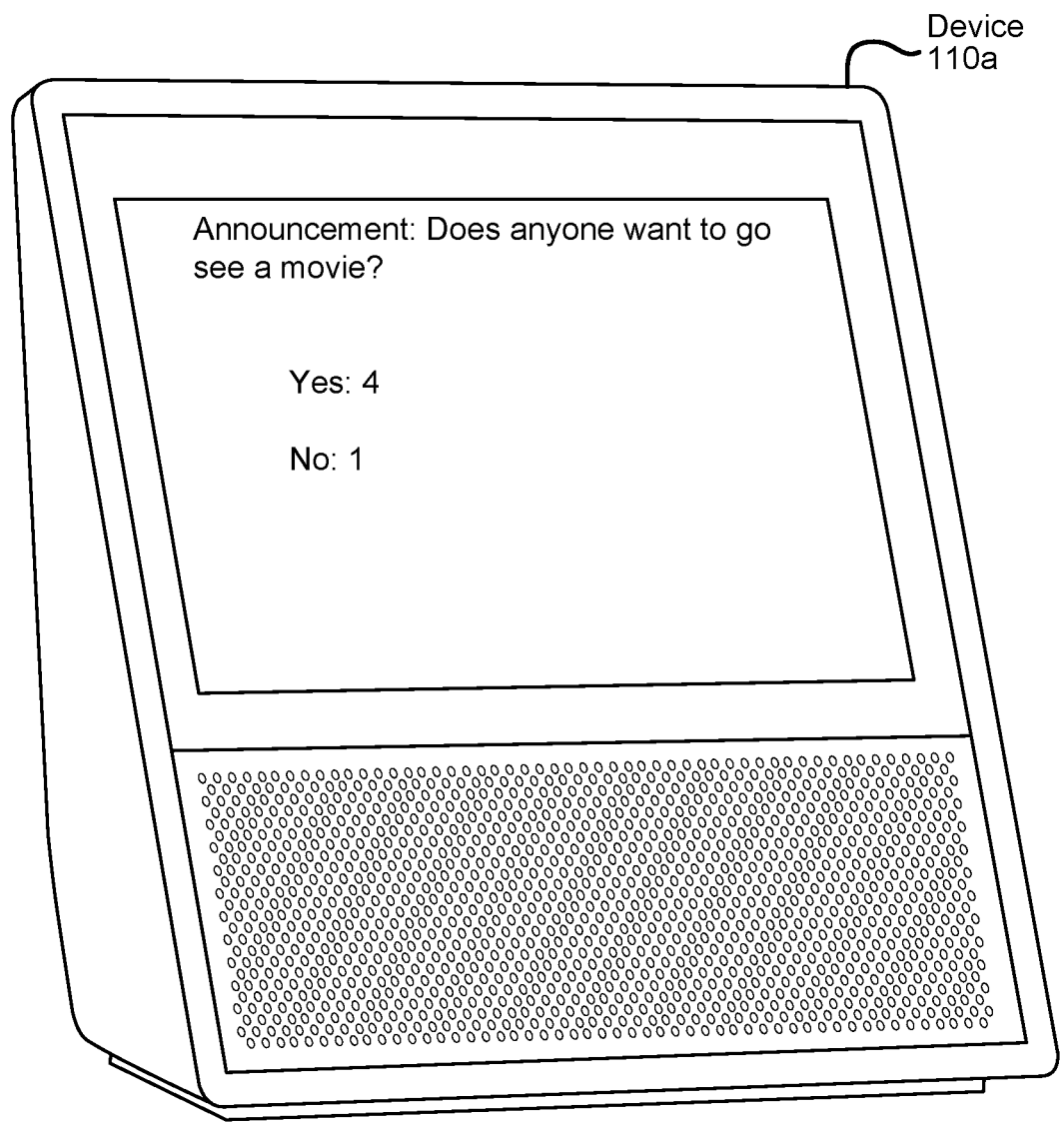
FIG. 16 illustrates a device displaying responses to an announcement according to embodiments of the present disclosure.

The device 110a displays (1322) text corresponding to the first and second input text data. The displayed text may indicate the devices from which responses were provided, such as "living room—on my way; hallway—be there soon" (as illustrated in FIG. 14). The displayed text may alternatively indicate the users that provided the responses, such as "John—on my way; Joe—be there soon" (as illustrated in FIG. 15). The displayed text may also summarize the responses, such as "4 yesses; 1 no" (as illustrated in FIG. 16).

Figure 17B:
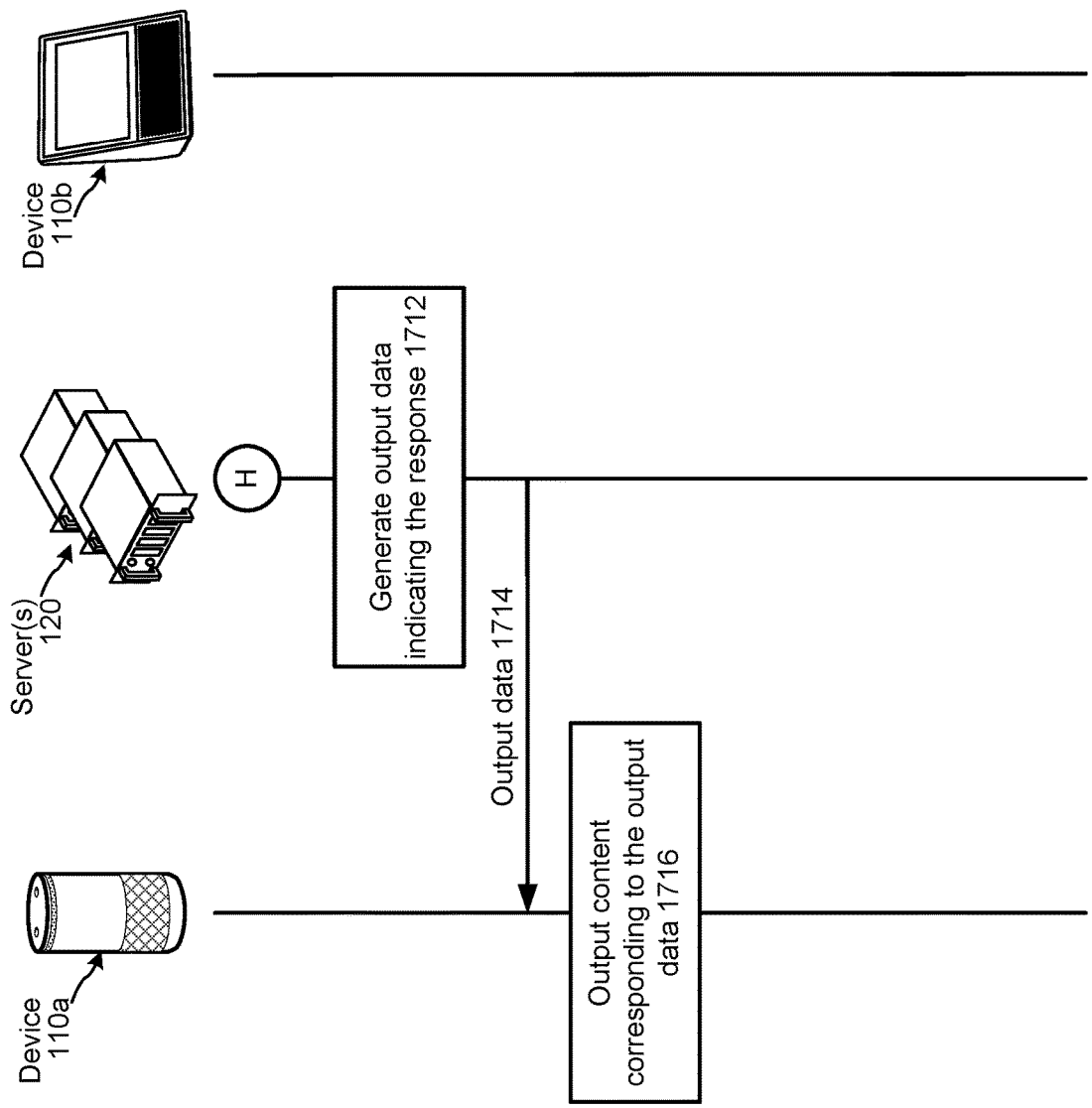

As described and illustrated, a user may respond to an announcement by speaking a response or by selecting a virtual button on a touch screen corresponding to a response. FIGS. 17A and 17B illustrate a gesture based response to an announcement after announcement content has already been output by the system to one or more users.

A device (e.g., the second device 110*b*) receives (1702) at least one image via a camera. The second device 110*b* sends (1704) image data corresponding to the at least one image to the server(s) 120.

The server(s) 120 determines (1706) a representation of at least a portion of a user in the image(s) represented in the image data. The server(s) 120 may determine the representation using techniques known in the art. The server(s) 120 determines (1708) the representation corresponds to a gesture and also determines (1710) the gesture corresponds to a response to the announcement. For example, the server(s) 120 may determine a representation of a "thumbs up" in one or more images corresponds to an affirmative response to the announcement, a representation of a "thumbs down" in one or more images corresponds to a negative response to the announcement, a representation of a head shaking from left and right in one or more images corresponds to a negative response to the announcement, a representation of a head shaking up and down in one or more images corresponds to an affirmative response to the announcement, etc.

The server(s) 120 generates (1712) output data indicating the response and sends (1714) the output data to the first device 110*a*. The first device 110*a* outputs (1716) content corresponding to the output data. For example, the output content may correspond to the image(s) received by the second device 110*b*. For further example, the output content may be text summarizing the response. For further example, the output content may be computer generated speech summarizing the response.

The server(s) 120 may alternatively send image data representing one or more images to the announcement originating device 110*a*, with the one or more images representing the announcement receiving user's response to the announcement. The device 110*a* may display the one or more images to the announcement originating user.

It has been described herein that announcement content may be audibly output to one or more announcement recipient users. One skilled in the art should appreciate that the system may also provide image announcement content and video announcement content to one or more announcement recipient users.

Figure 18:
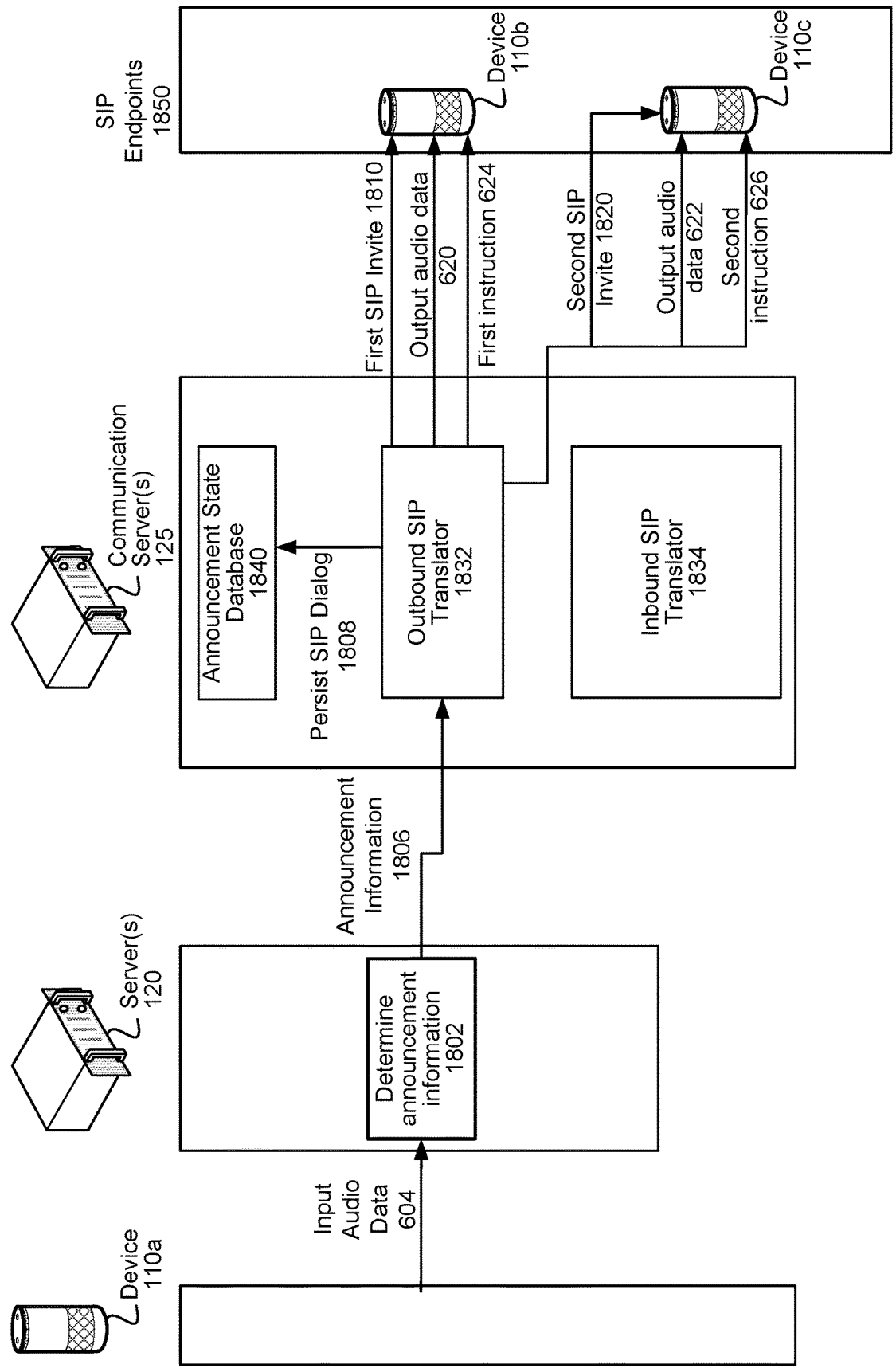
FIG. 18 illustrates an example of signaling to initiate an announcement according to embodiments of the present disclosure.

FIG. 18 illustrates an example of signaling to initiate an announcement. As described, the server(s) 120 is configured to enable commands (e.g., perform ASR, NLU, etc. to identify a command included in input data). The system may also be configured with one or more communication servers 125 that enable communication sessions such as announcements (e.g., using session initiation protocol (SIP)). For example, the communication server(s) 125 may send SIP messages to endpoints 1850 (e.g., the second device 110*b*, the third device 110*c*, etc.) in order to establish a communication session for sending and receiving audio data, video data, and/or image data. A communication session may use network protocols such as real-time transport protocol (RTP), RTP Control Protocol (RTCP), Web Real-Time communication (WebRTC), and/or the like. For example, the communication server(s) 125 may send SIP messages to initiate and facilitate RTP media streams between multiple endpoints (e.g., RTP media streams between the first device 110*a* and the communication server(s) 125 and between the communication server(s) 125 and the second device 110*b*, RTP media streams between the first device 110*a* and the communication server(s) 125 and between the communication server(s) 125 and the third device 110*c*, etc.). During a communication session, the communication server(s) 125 may initiate two media streams, with a first media stream corresponding to input announcement audio data from the first device 110*a* to the communication server(s) 125 and a second media stream corresponding to output announcement audio data from the communication server(s) 125 to the second device 110*b*, although for ease of explanation this may be illustrated as a single RTP media stream.

As illustrated in FIG. 18, the first device 110*a* may send (604) input audio data to the server(s) 120 and the server(s) 120 may determine (1802) announcement information using the input audio data and may send (1806) the announcement information to the communication server(s) 125. The server(s) 120 may determine the announcement information by performing ASR, NLU, etc., as discussed above, and the announcement information may include a data source name (DSN) encodings, and/or additional information. For example, the server(s) 120 may identify which devices (e.g., the second device 110*b*, the third device 110*c*, etc.) should output announcement content represented in the announcement information.

While FIG. 18 illustrates the server(s) 120 sending the announcement information to the communication server(s) 125 in a single step (e.g., 1806), the present disclosure is not limited thereto. Instead, the server(s) 120 may send the announcement information to the first device 110*a* and the first device 110*a* may send the announcement information to the communication server(s) 120. Thus, the server(s) 120 may not communicate directly with the communication server(s) 125 in step 1806, but may instead instruct the first device 110*a* to connect to the communication server(s) 125 in order to initiate an announcement.

The communication server(s) 125 may include an outbound SIP translator 1832, an inbound SIP translator 1834 and an announcement state database 1840. The outbound SIP translator 1832 may include logic to convert signals received from the server(s) 120 into SIP requests/responses and may handle sending outgoing SIP requests and sending responses to incoming SIP requests. After receiving the announcement information, the outbound SIP translator 1832 may persist (1808) an SIP dialog using the announcement state database 1840. For example, the DSN may include information such as the name, location, and driver associated with the announcement state database 1840 (and, in some examples, a user identifier (ID) and password of the user) and the outbound SIP translator 1832 may send an SIP dialog to the announcement state database 1840 regarding the communication session. The announcement state database 1840 may persist the announcement state if provided a device ID and one of an announcement ID or a dialog ID. The outbound SIP translator 1832 may send an SIP invite, output audio data, and an instruction to output the output audio data to each SIP endpoint 1850 determined as described herein. For example, the server(s) 120 may send information indicating the desired announcement output devices to the communication server(s) 125, and the communication server(s) 125 may send an SIP invite, output audio data, and instruction to each of the desired announcement output devices. For example, the communication server(s) 125 may send a first SIP invite (1810), output audio data including announcement content (620), and a first instruction (624) to the second device 110*b*. For further example, the communication server(s) 125 may send a second SIP invite (1820), output audio data including announcement content (622), and a second instruction (626) to the third device 110c.

Figure 19:
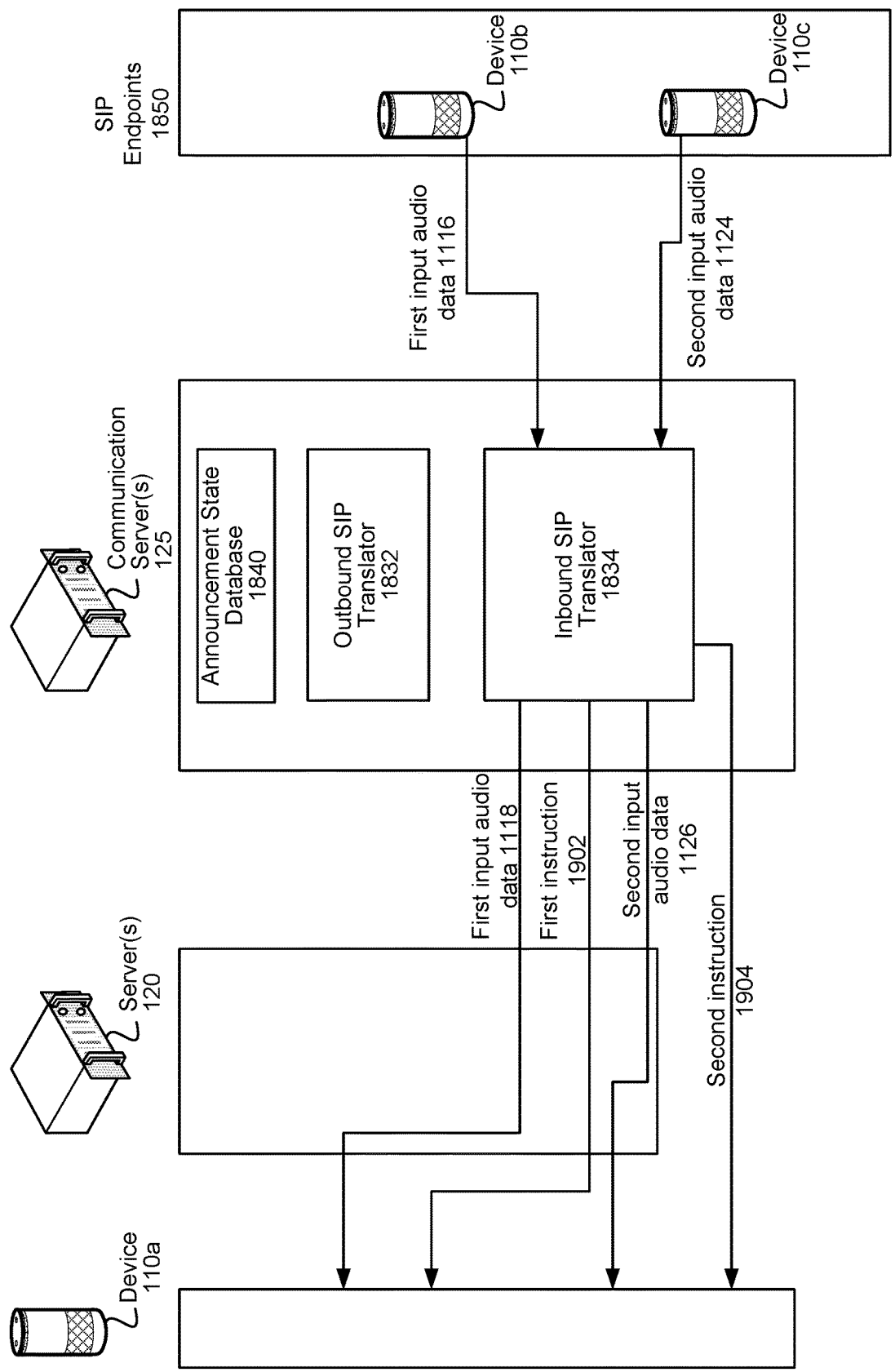
FIG. 19 illustrates an example of signaling used to communicate announcement responses to an announcement originating device according to embodiments of the present disclosure.

FIG. 19 illustrates an example of signaling used to communicate announcement responses to an announcement originating device. The second device 110b sends 1116) first input audio data corresponding to a first announcement response to the inbound SIP translator 1834. The third device 110c sends (1124) second input audio data corresponding to a second announcement response to the inbound SIP translator 1834. The inbound SIP translator 1834 may receive the first and second input audio data at different times. Alternatively, the input SIP translator 1834 may receive the first and second input audio data at or substantially at the same time. The inbound SIP translator 1834 sends (1118) the first input audio data to the first device 110a as well as sends (1902) a first instruction to output the first input audio data to the first device 110a. The inbound SIP translator 1834 also sends (1126) the second input audio data to the first device 110a as well as sends (1904) a second instruction to output the second input audio data to the first device 110a. The inbound SIP translator 1834 may send the first input audio data, first instruction, second input audio data, and second instruction to the first device 110a either directly or via the server(s) 120.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data and/or any other data without departing from the disclosure.

Figure 20:
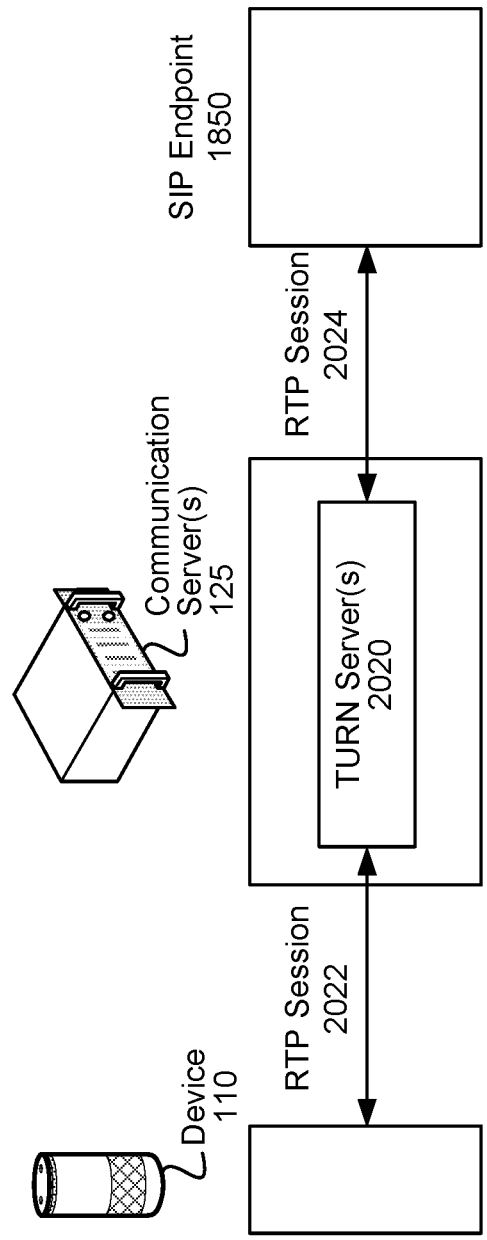
FIG. 20 illustrates an example of establishing media streams between devices according to embodiments of the present disclosure.

FIG. 20 illustrates an example of establishing media streams between devices. A device 110 may not have a publicly accessible Internet Protocol (IP) address. For example, in some types of Network Address Translators (NATs), the device 110 cannot route outside of a local network. To enable the device 110 to establish an RTP communication session, the communication server(s) 125 may include Traversal Using Relays around NAT (TURN) server(s) 2020. The TURN server(s) 2020 may be configured to connect the device 110 to an SIP endpoint 1850 when the device 110 is behind a NAT. As illustrated in FIG. 20, the device 110 may establish (2022) an RTP session with the TURN server(s) 2020 and the TURN server(s) 2020 may establish (2024) an RTP session with the SIP endpoint 1850. Thus, the device 110 may communicate with the SIP endpoint 1850 via the TURN server(s) 2020. For example, the device 110 may send outgoing audio data to the communication server(s) 125 and the communication server(s) 125 may send the outgoing audio data to the SIP endpoint 1850. Similarly, the SIP endpoint 1850 may send incoming audio data to the communication server(s) 125 and the communication server(s) 125 may send the incoming audio data to the device 110.

Figure 21:
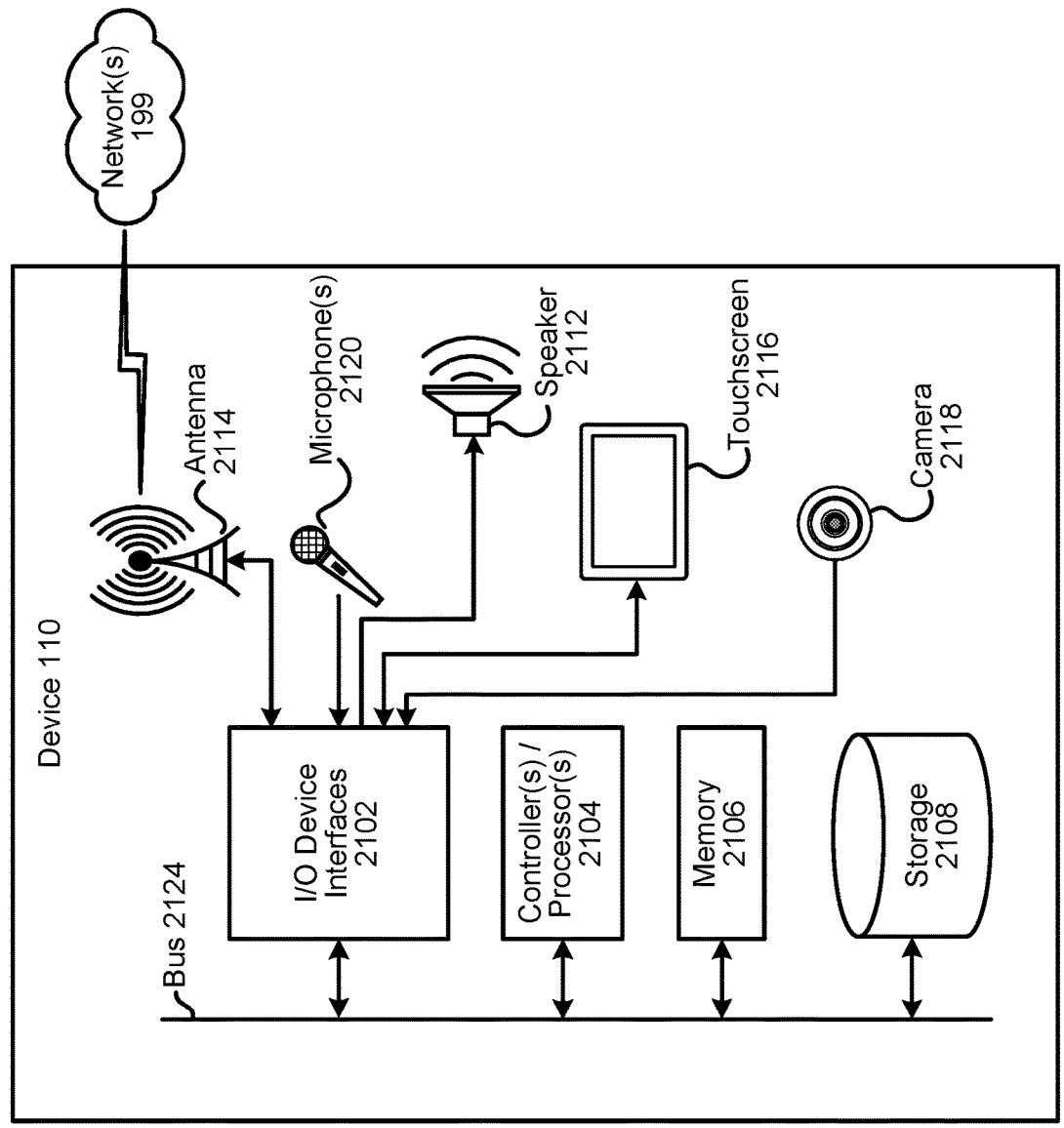
FIG. 21 is a block diagram conceptually illustrating example components of a device according to embodiments of the present disclosure.

FIG. 21 is a block diagram conceptually illustrating a user device 110 that may be used with the system. FIG. 22 is a block diagram conceptually illustrating example components of a remote device, such as the server(s) 120, which may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (2104/2204), which may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive memory (MRAM), and/or other types of memory. Each device (110/120) may also include a data storage component (2108/2208) for storing data and controller/processor-executable instructions. Each data storage component (2108/2208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (2102/2202).

Computer instructions for operating each device (110/120) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120) includes input/output device interfaces (2102/2202). A variety of components may be connected through the input/output device interfaces (2102/2202), as will be discussed further below. Additionally, each device (110/120) may include an address/data bus (2124/2224) for conveying data among components of the respective device. Each component within a device (110/120) may also be directly connected to other components in addition to (or instead of) being connected to other components across the bus (2124/2224).

Referring to FIG. 21, the device 110 may include input/output device interfaces 2102 that connect to a variety of components such as an audio output component such as a speaker 2112, a wired headset or a wireless headset (not illustrated), or other component capable of outputting audio. The device 110 may also include an audio capture component. The audio capture component may be, for example, a microphone 2120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a touchscreen 2116 for displaying content and detecting user interactions with virtual buttons, among other things. The device 110 may moreover including a camera(s) 2118 for capturing one or more images. The device 110 may further include a button, light ring or other light indicator, haptic component, as well as other input/output capabilities.

Via antenna(s) 2114, the input/output device interfaces 2102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (2102/2202) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (2102/2202), processor(s) (2104/2204), memory (2106/2206), and/or storage (2108/2208) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 23, multiple devices (110a-110h, 120, 2002) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110d, a smart watch 110e, a tablet computer 110f, a vehicle 110g, and/or a display device 110h may be connected to the network(s) 199 through a wireless service provider, over a WiFi or cellular network connection, or the like. Other devices are included as network-connected support devices, such as the server(s) 120, content source server(s) 2002 (which may provide content for output by the server(s) 120), or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device associated with a profile, input audio data corresponding to an utterance, wherein the profile corresponds to a first user, a second user, and a third user;
    processing the input audio data to determine the utterance was spoken by the first user;
    performing speech processing on the input audio data to determine a command to output an announcement;
    determining a first portion of the input audio data corresponding to announcement content;

determining, based on the announcement content, a plurality of recipients for the announcement, the plurality of recipients comprising the second user and the third user;
receiving first presence data indicating the second user is near a second device associated with the profile;
receiving second presence data indicating the third user is near a third device associated with the profile;
generating output audio data corresponding to the first portion of the input audio data;
determining, based at least in part on the announcement content, a length of time of relevance of the output audio data;
sending a first command, based at least in part on the first presence data and the length of time, to the second device to emit output audio corresponding to the output audio data without receiving a first indication from the second user to emit the output audio; and
sending a second command, based at least in part on the second presence data and the length of time, to the third device to emit, the output audio corresponding to the output audio data without receiving a second indication from the third user to emit the output audio.

2. The computer-implemented method of claim 1, wherein determining the plurality of recipients comprises:
determining previous system interactions including the announcement content;
determining intended recipient users mentioned in the previous system interactions; and
determining the second user and the third user correspond to the intended recipient users.

3. The computer-implemented method of claim 1, further comprising:
causing the second device to emit the output audio during a first time period;
causing the third device to emit the output audio during a first time period;
receiving, during a second time period after the first time period, third presence data indicating the second user and the third user are near the first device; and
determining a second length of time for storing the output audio data based on the first time period and the second time period.

4. The computer-implemented method of claim 1, further comprising:
causing, based on determining the command to output the announcement, the second device to disable a first microphone; and
causing, based on determining the command to output the announcement, the third device to disable a second microphone.

5. A system comprising:
at least one processor; and
at least one memory including instructions that, when executed by the at least one processor, cause the system to:
receive, from a first device, input audio data;
determine the input audio data corresponds to a command to output an announcement;
determine first content;
determine a second device associated with a first recipient user;
determine a third device associated with a second recipient user;
receive first presence data that indicates the first recipient user is proximate to the second device;
receive second presence data that indicates the second recipient user is proximate to the third device;
generate output data corresponding at least in part to the first content;
determine a length of time of relevance of the output data;
send a first command, based at least in part on the first presence data and the length of time, to the second device to emit second content corresponding to the output data without receiving a first indication from the first recipient user to emit the second content; and
send a second command, based at least in part on the second presence data and the length of time, to the third device to emit third content corresponding to the output data without receiving a second indication from the second recipient user to emit the third content.

6. The system of claim 5, wherein the instructions, when executed by the at least one processor, further cause the system to:
determine a portion of the input audio data indicating a location; and
determine the second device and the third device are associated with the location.

7. The system of claim 5, wherein the instructions, when executed by the at least one processor, further cause the system to:
determine a portion of the input audio data indicating a group of recipient users;
determine the first recipient user is associated with the group; and
determine the second recipient user is associated with the group.

8. The system of claim 5, wherein the instructions, when executed by the at least one processor, further cause the system to:
determine the second device is emitting output audio; and
instruct the second device to cease emitting the output audio.

9. The system of claim 5, wherein the instructions, when executed by the at least one processor, further cause the system to:
determine the second device is displaying video content;
generate output text data corresponding to the first content;
send the output text data to the second device; and
instruct the second device to display output text corresponding to the output text data while the second device displays the video content.

10. The system of claim 5, wherein the instructions, when executed by the at least one processor, further cause the system to:
determine the second device is outputting fourth content; and
instruct the second device to output an indicator that the output data was received by the second device.

11. The system of claim 5, wherein the instructions, when executed by the at least one processor, further cause the system to:
cause the second device to emit the second content in a first time period;
cause the third device to emit the third content in the first time period;
receive, in a second time period, an indication that the first recipient user and the second recipient user are associated with the first device; and determine a length of time for storing the output data based on the first time period and the second time period.

12. The system of claim 5, wherein the instructions, when executed by the at least one processor, further cause the system to:
receive the input audio data based on a third user interacting with a button of the first device.

13. The system of claim 5, wherein the instructions, when executed by the at least one processor, further cause the system to:
determine at least one of the first device or the second device is displaying visual content;
determine output text data corresponding to the first content;
send the output text data to at least one of the first device or the second device; and
instruct at least one of the first device or the second device to display output text corresponding to the output text data while the at least one of the first device or the second device is displaying visual content.

14. A computer-implemented method comprising:
receiving, from a first device, input audio data;
determining the input audio data corresponds to a command to output an announcement;
determining first content;
determining a second device associated with a first recipient user;
determining a third device associated with a second recipient user;
receiving first presence data that indicates the first recipient user is proximate to the second device;
receiving second presence data that indicates the second recipient user is proximate to the third device;
generating output data corresponding at least in part to the first content;
determining a length of time of relevance of the output data;
sending a first command, based at least in part on the first presence data and the length of time, to the second device to emit second content corresponding to the output data without receiving a first indication from the first recipient user to emit the second content; and
sending a second command, based at least in part on the second presence data and the length of time, to the third device to emit third content corresponding to the output data without receiving a second indication from the second recipient user to emit the third content.

15. The computer-implemented method of claim 14, further comprising:
determining a portion of the input audio data indicating a location; and
determining the second device and the third device are associated with the location.

16. The computer-implemented method of claim 14, further comprising:
determining a portion of the input audio data indicating a group of recipient users;
determining the first recipient user is associated with the group; and
determining the second recipient user is associated with the group.

17. The computer-implemented method of claim 14, further comprising:
determining the second device is emitting output audio; and
instructing the second device to cease emitting the output audio.

18. The computer-implemented method of claim 14, further comprising:
determining the second device is displaying video content;
generating output text data corresponding to the first content;
sending the output text data to the second device; and
instructing the second device to display output text corresponding to the output text data while the second device displays the video content.

19. The computer-implemented method of claim 14, further comprising:
determining the second device is outputting fourth content; and
instructing the second device to output an indicator that the output data was received by the second device.

20. The computer-implemented method of claim 14, further comprising:
causing the second device to emit the first content in a first time period;
causing the third device to emit the second content in the first time period;
receiving, in a second time period, an indication that the first recipient user and the second recipient user are associated with the first device; and
determining a length of time for storing the output data based on the first time period and the second time period.

21. The computer-implemented method of claim 14, further comprising:
receiving the input audio data based on a third user interacting with a button of the first device.

* * * * *